United States Patent
Schlanger

(10) Patent No.: US 12,409,677 B2
(45) Date of Patent: Sep. 9, 2025

(54) VEHICLE WHEEL SPOKE CONNECTION

(71) Applicant: Raphael Schlanger, Wilton, CT (US)

(72) Inventor: Raphael Schlanger, Wilton, CT (US)

( * ) Notice: Subject to any disclaimer, the term of this patent is extended or adjusted under 35 U.S.C. 154(b) by 478 days.

(21) Appl. No.: 17/740,731

(22) Filed: May 10, 2022

(65) Prior Publication Data

US 2022/0288967 A1    Sep. 15, 2022

Related U.S. Application Data

(63) Continuation-in-part of application No. 16/988,666, filed on Aug. 9, 2020, now Pat. No. 11,667,148.

(60) Provisional application No. 63/186,133, filed on May 9, 2021, provisional application No. 62/884,684, filed on Aug. 9, 2019.

(51) Int. Cl.
| | |
|---|---|
| *B60B 1/04* | (2006.01) |
| *B60B 21/02* | (2006.01) |
| *B60B 21/06* | (2006.01) |

(52) U.S. Cl.
CPC .............. *B60B 1/044* (2013.01); *B60B 1/041* (2013.01); *B60B 21/025* (2013.01); *B60B 21/064* (2013.01)

(58) Field of Classification Search
CPC ....... B60B 1/0261; B60B 1/041; B60B 1/043; B60B 1/044; B60B 1/045; B60B 21/025; B60B 21/062

See application file for complete search history.

(56) References Cited

U.S. PATENT DOCUMENTS

| | | | | |
|---|---|---|---|---|
| 1,353,394 | A | * | 9/1920 | House, Jr. ............. B60B 21/064 301/59 |
| 5,350,221 | A | * | 9/1994 | Pearce .................... B60B 1/003 301/58 |
| 2006/0125312 | A1 | * | 6/2006 | Hjertberg ................ B60B 1/041 301/58 |
| 2006/0138855 | A1 | * | 6/2006 | Schlanger ............ B60B 21/025 301/95.101 |
| 2007/0138860 | A1 | * | 6/2007 | Cappellotto .......... B60B 1/0246 301/104 |
| 2010/0301662 | A1 | * | 12/2010 | Schlanger ............. B60B 21/062 301/58 |
| 2012/0212036 | A1 | * | 8/2012 | Goto ....................... B60B 21/06 301/58 |

* cited by examiner

*Primary Examiner* — S. Joseph Morano
*Assistant Examiner* — Emily G. Castonguay

(57) ABSTRACT

A vehicle wheel having a rim, a hub, a plurality of spokes extending between said rim and said hub, rim and/or hub includes a spoke bed wall with an outboard bed surface, an inboard bed surface, and a spoke hole therethrough having a longitudinally inboard entrance. The spoke includes: a first spoke portion and a second spoke portion longitudinally inboard of the first spoke portion and laterally outboard of the first spoke portion, including a transition surface therebetween. The spoke extends through the spoke hole and at least a portion of the transition surface is longitudinally outboard of the inboard entrance and the spoke is connected to the rim and/or hub at the first spoke portion.

27 Claims, 12 Drawing Sheets

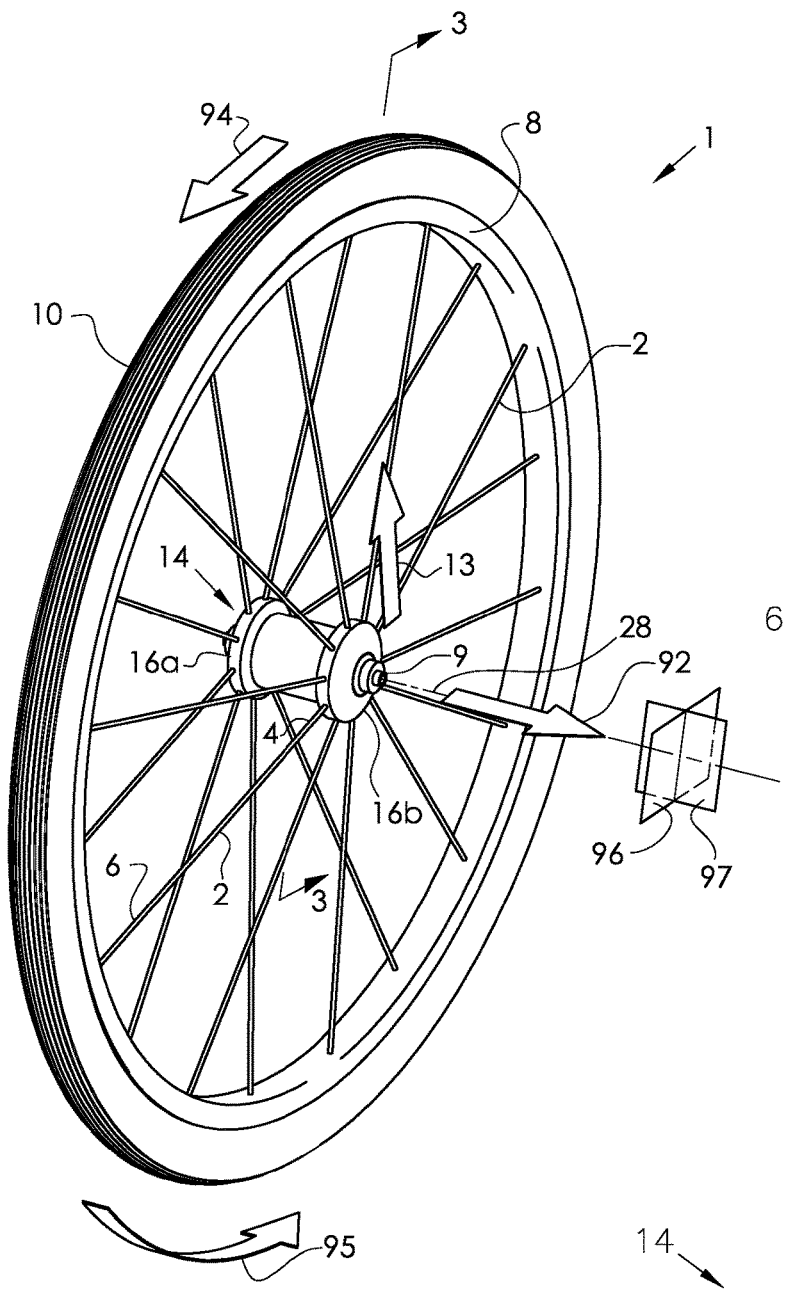
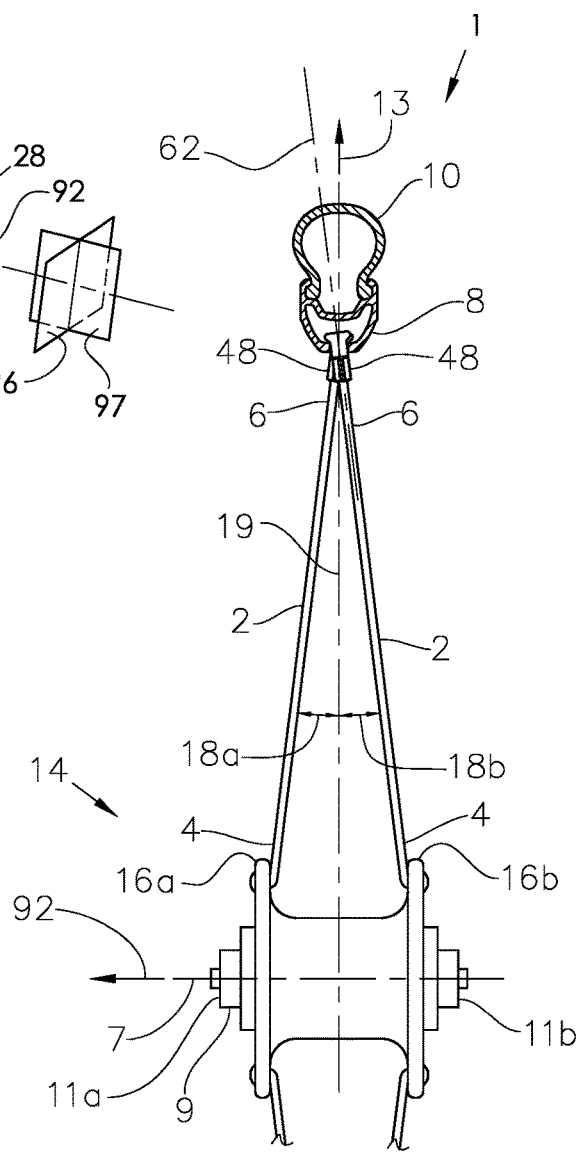
Fig. 1a
Prior Art
Fig. 1b
Prior Art

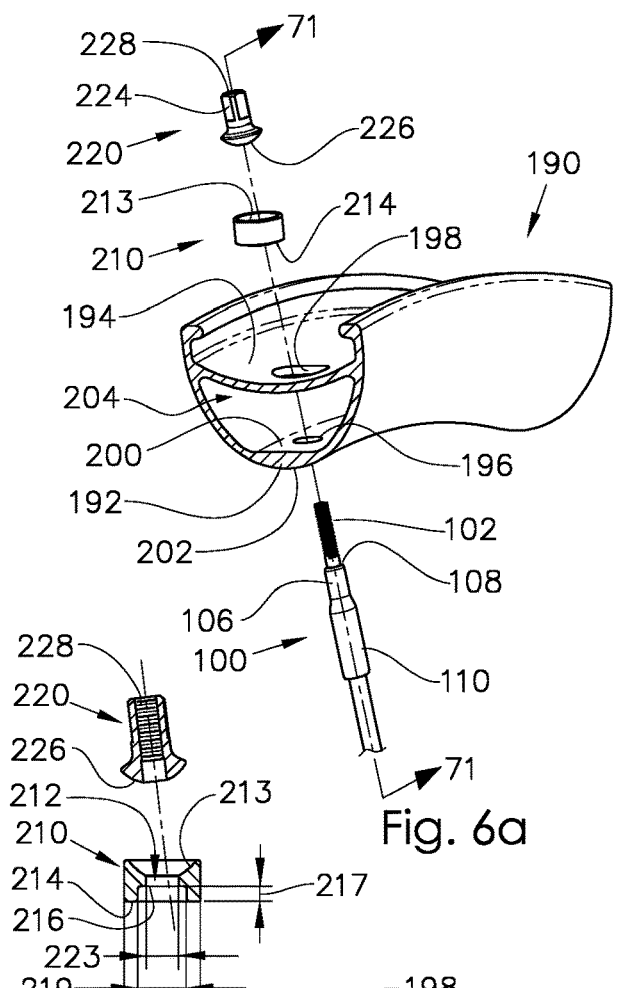
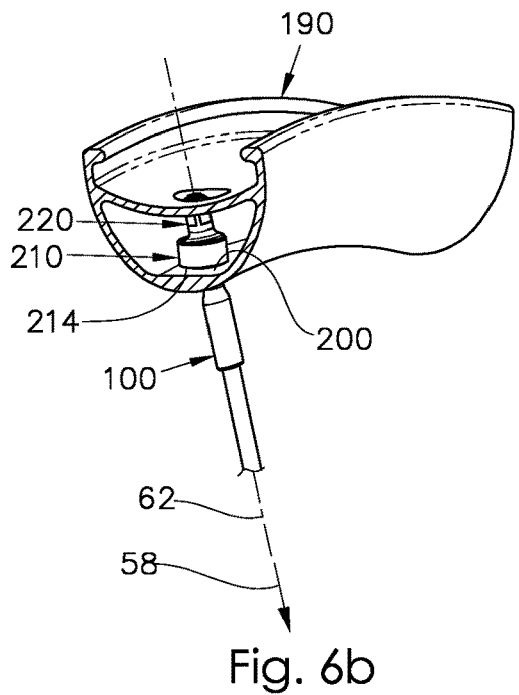
Fig. 6a
Fig. 6b
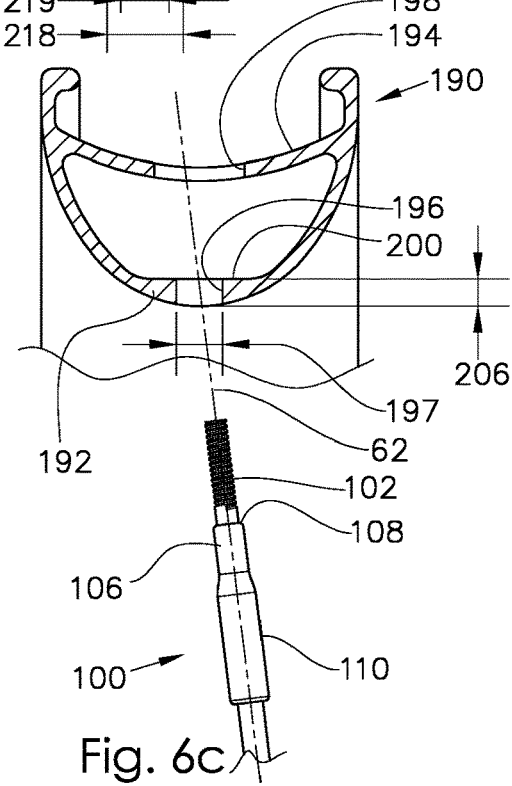
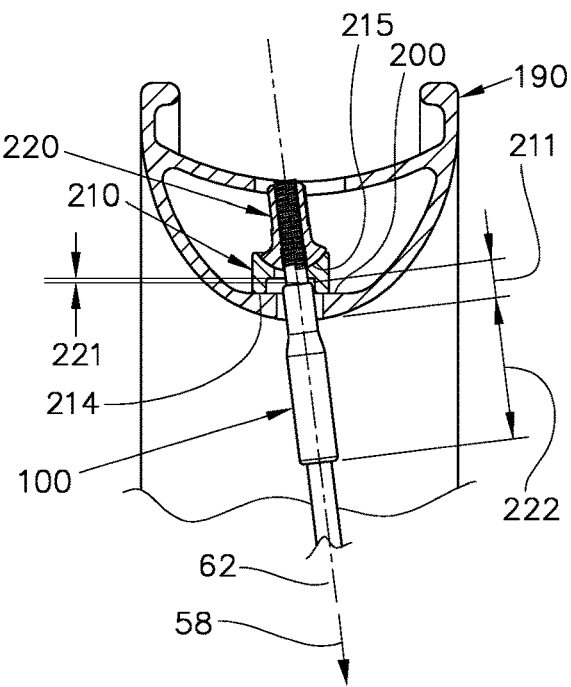
Fig. 6c
Fig. 6d

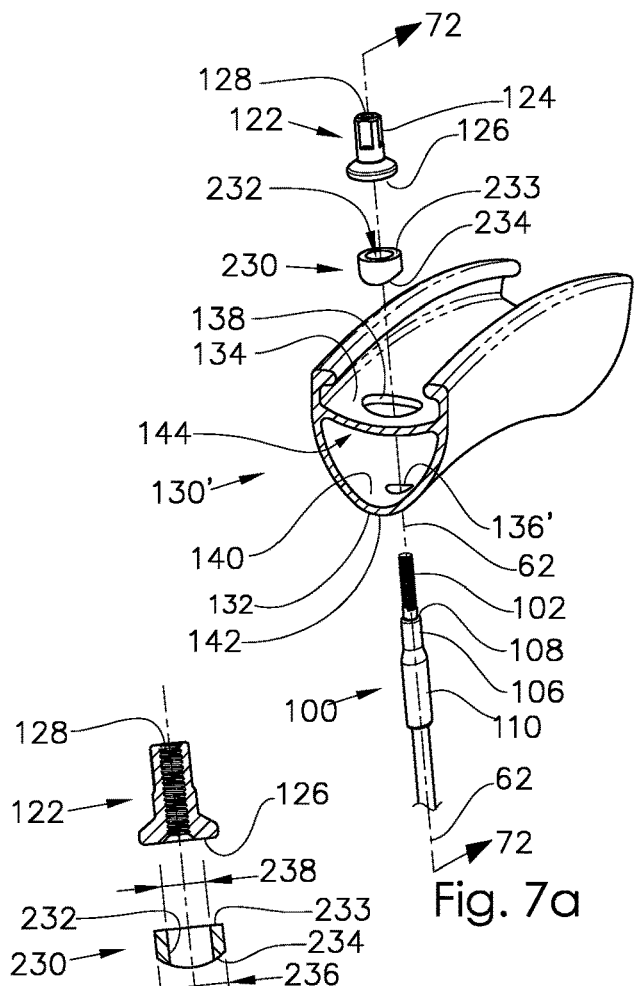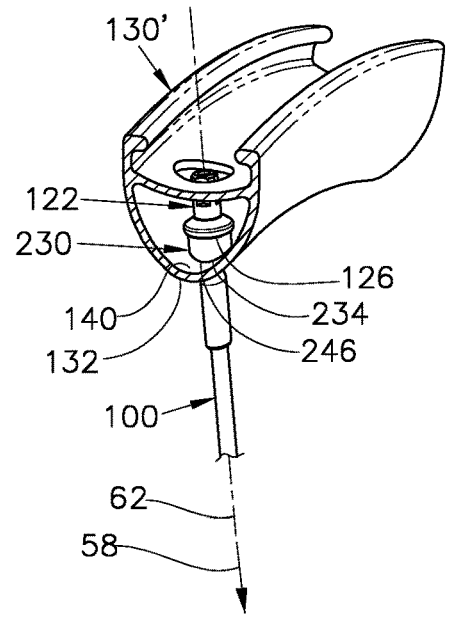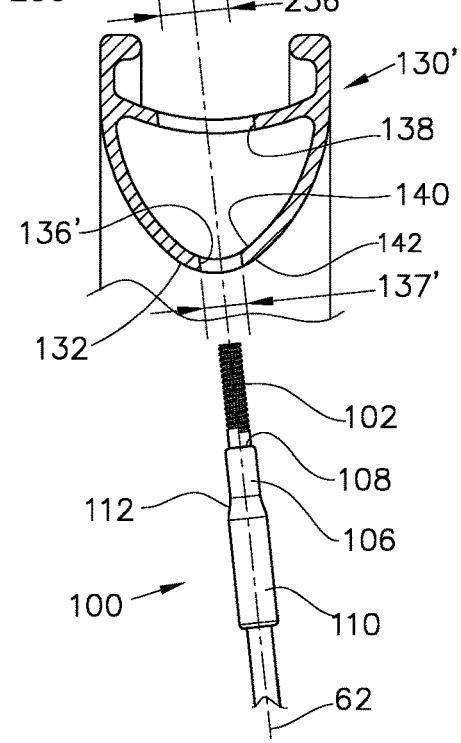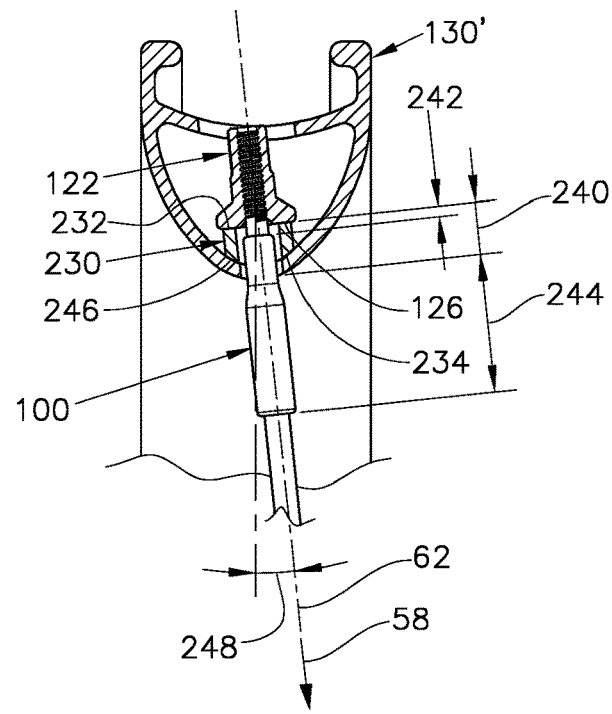
Fig. 7a
Fig. 7b
Fig. 7c
Fig. 7d

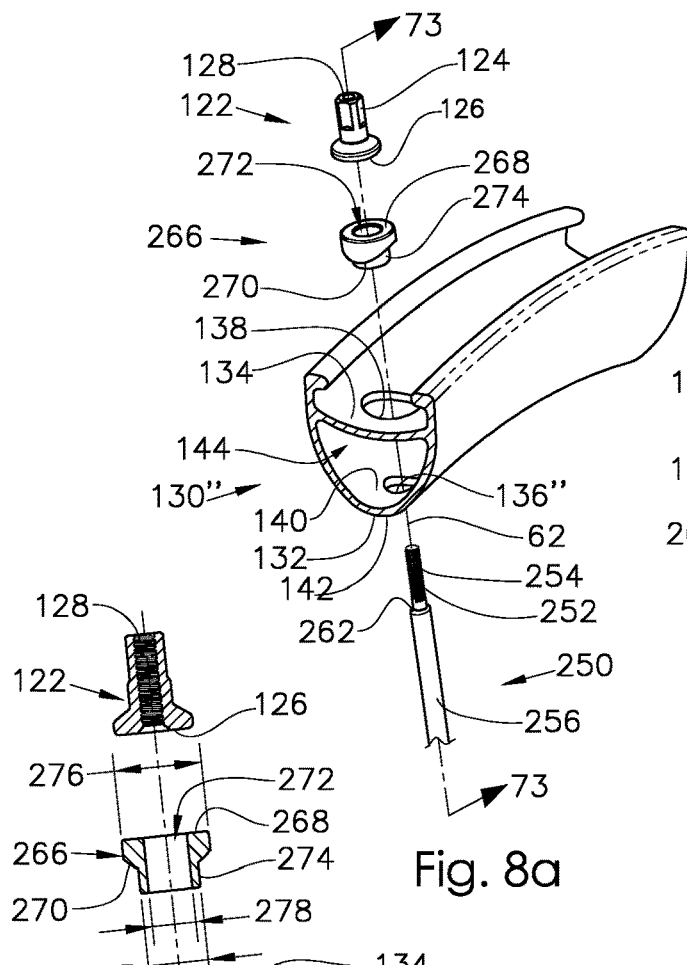
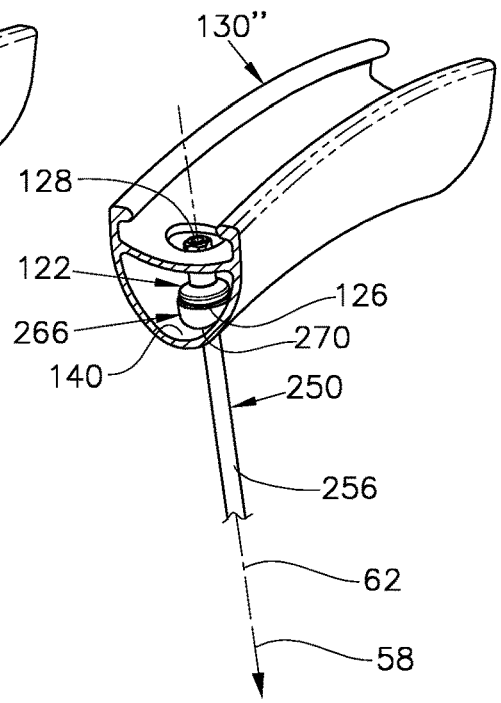
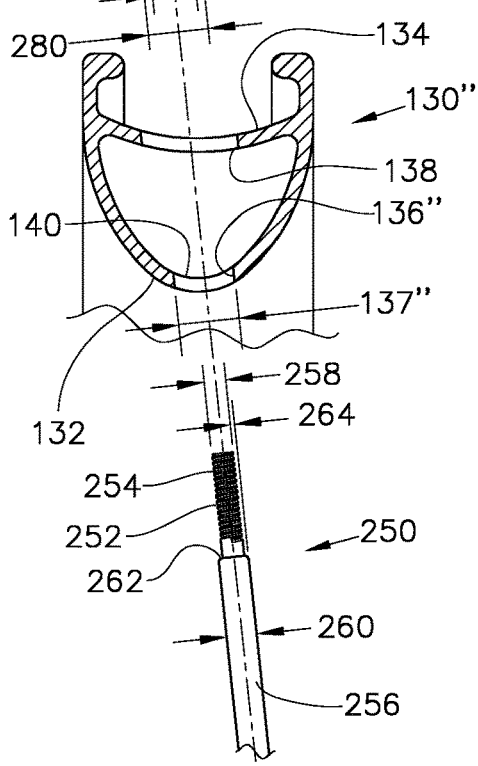
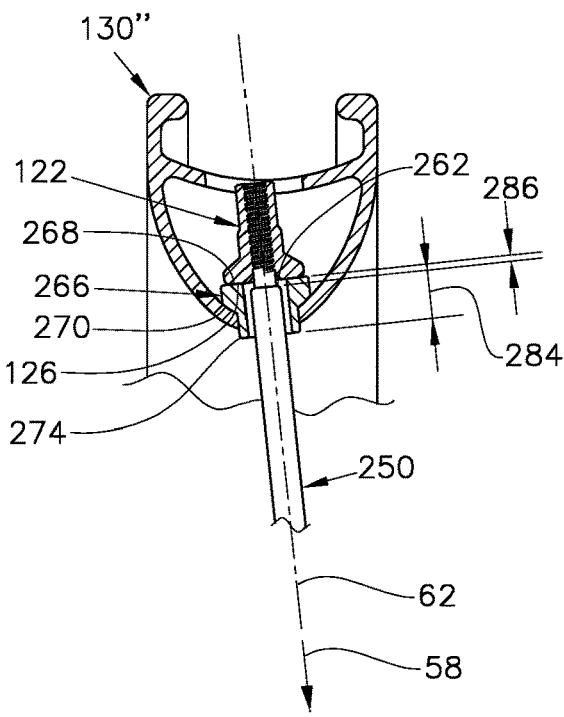
Fig. 8a
Fig. 8b
Fig. 8c
Fig. 8d

VEHICLE WHEEL SPOKE CONNECTION

CROSS-REFERENCE TO RELATED APPLICATIONS

This application claims priority of Provisional Patent Application Ser. No. 63/186,133, filed May 9, 2021;

This application is also a Continuation-In-Part of U.S. patent application Ser. No. 16/988,666, filed Aug. 9, 2020 and currently pending;

U.S. patent application Ser. No. 16/988,666 claims priority of Provisional Patent Application Ser. No. 62/884,684, filed Aug. 9, 2019;

U.S. patent application Ser. No. 16/988,666 is also a Continuation-In-Part of U.S. patent application Ser. No. 17/020,852, filed Sep. 15, 2020 and currently pending;

U.S. patent application Ser. No. 17/020,852 is a Continuation-In-Part of U.S. patent application Ser. No. 15/412,151, filed Jan. 23, 2017 and as U.S. Pat. No. 10,814,671 on Oct. 27, 2020;

U.S. patent application Ser. No. 15/412,151 claims priority of Provisional Patent Application Ser. No. 62/289,389, filed Feb. 1, 2016;

U.S. patent application Ser. No. 15/412,151 is also a Continuation-In-Part of U.S. patent application Ser. No. 14/641,615, filed Mar. 9, 2015 and issued as U.S. Pat. No. 9,815,321 on Nov. 14, 2017;

U.S. patent application Ser. No. 14/641,615 is a Continuation-In-Part of U.S. patent application Ser. No. 12/930,643, filed Jan. 13, 2011 and issued as U.S. Pat. No. 8,985,709 on Mar. 24, 2015;

U.S. patent Ser. No. 12/930,643 is a Continuation-In-Part of U.S. patent application Ser. No. 12/806,064, filed Aug. 5, 2010 and issued as U.S. Pat. No. 8,657,387 on Feb. 25, 2014;

U.S. patent application Ser. No. 12/806,064 is a Continuation-In-Part of U.S. patent application Ser. No. 11/879,333, filed Jul. 17, 2007 and issued as U.S. Pat. No. 7,784,878 on Aug. 31, 2010;

U.S. patent application Ser. No. 11/879,333 is a Continuation-In-Part of U.S. patent application Ser. No. 10/755,653, filed Jan. 12, 2004 and issued as U.S. Pat. No. 7,357,460 on Apr. 15, 2008;

U.S. patent application Ser. No. 10/755,653 claims priority of U.S. provisional patent application Ser. No. 60/439,819, filed Jan. 13, 2003.

BACKGROUND OF THE INVENTION

The present invention relates to spoked vehicle wheels and bicycle wheels in particular. More specifically, this invention relates to the interface between the spoke and the spoke bed of the bracing element. The bracing element constitutes the rim and/or hub of the vehicle wheel.

Prior art wheels commonly include wire spokes that are connected to the rim by mating spoke nipples. These nipples are commonly termed "external nipples" if the nipple passes radially inwardly through the spoke hole of the rim so that the nipple is exposed and may be manipulated at a location radially inboard of the rim's spoke bed wall. The nipples are commonly termed "internal nipples" if the nipple does not extend radially inboard of the spoke bed wall and if the nipple may be manipulated through access at a point radially outboard of the spoke bed wall.

Particularly with the advent of spokes made of carbon fiber composite or other alternative materials, the spoke may be configured to have a laterally narrower first portion thereof that is positioned longitudinally outwardly from a laterally wider portion thereof. For example, the first portion may be configured to mimic a traditional wire spoke having external threads, while the second portion may be of carbon fiber composite or other alternate material.

In a conventional spoke/nipple/rim arrangement, the nipple may be threadably assembled to the narrower first portion of the spoke. This leaves a portion of the first portion exposed to allow for the requisite threadable adjustment. Thus the spoke is necked down to expose the first portion, resulting in an unsightly transition between the spoke and the nipple and/or the rim. The result is a wheel that has poor aesthetics and is visually objectionable to the user.

In addition, the stepped transition between the first portion, the second portion, the nipple, and/or the rim creates multiple steps in geometry that is disruptive to air flow in the aerodynamically-critical region between the spoke and the rim. The potential result is greater aerodynamic drag due to this increased number of steps in geometry.

It is a goal of the present invention to create a spoke connection that is visually clean and has good aesthetics. It is a further goal to optimize aerodynamics of the wheel by creating a smoother transition between the spoke and the rim and/or hub, with fewer exposed steps in geometry.

SUMMARY OF THE INVENTION

The present invention includes a spoke that has a longitudinally outward portion of smaller lateral dimension than a longitudinally inward portion thereof. This creates a laterally extending transition step between the longitudinally outward and longitudinally inward portions. The spoke passes through an opening in the rim and/or hub and the transition step is positioned to be longitudinally outward of the longitudinally inward entrance to the opening.

The embodiments of the present invention are focused on shielding the transition step between the first and second portions of the spoke. By visually shielding this transition, the aesthetics of the wheel is improved. Furthermore, by shielding this transition, the number of aforementioned steps in geometry that are exposed to the wind is reduced, resulting in a wheel with enhanced aerodynamics.

Further features of the present invention will become apparent from considering the drawings and ensuing description.

BRIEF DESCRIPTION OF THE DRAWINGS

The present invention will be more readily understandable from a consideration of the accompanying exemplificative drawings, wherein:

FIG. 1a is a perspective view schematically illustrating the general configuration of a vehicle wheel as applied to a bicycle wheel.

FIG. 1B is an axial plane cross-sectional view of the wheel of FIG. 1a, taken along 3-3;

FIG. 3c is an axial plane cross-section detail view of the wheel of FIG. 3a, corresponding to the configuration shown in FIG. 3a;

FIG. 3e is an orthogonal detail view, taken along 67-67, showing the spoke of FIG. 3a;

FIG. 3f is an orthogonal detail view, taken along 68-68, showing the spoke of FIG. 3a;

FIG. 3g is perspective detail view, showing the spoke of FIG. 3a;

FIG. 4c is an axial plane cross-section exploded detail view, taken along 69-69, of the embodiment of FIG. 4a and corresponding to the assembly sequence of FIG. 4a;

FIG. 5c is an axial plane cross-section exploded detail view, taken along 70-70, of the embodiment of FIG. 5a and corresponding to the assembly sequence of FIG. 5a;

FIG. 6a is a partial perspective exploded detail view of a fourth embodiment of the present invention, with the rim shown in axial plane cross-section, including an intermediate washer;

FIG. 6b is a partial perspective detail view, showing the embodiment of FIG. 6a, with the rim shown in axial plane cross-section, and with the spoke, intermediate washer, and spoke nipple next assembled through a spoke hole of the rim;

FIG. 6c is an axial plane cross-section exploded detail view, taken along 71-71, of the embodiment of FIG. 6a and corresponding to the assembly sequence of FIG. 6a;

FIG. 6d is an axial plane cross-section detail view, taken along 71-71, of the embodiment of FIG. 6a and corresponding to the assembly sequence of FIG. 6b, showing the enlarged portion of the spoke longitudinally overlapping both the spoke hole of the rim and a recess of the intermediate washer;

FIG. 7a is a partial perspective exploded detail view of a fifth embodiment of the present invention, with the rim shown in axial plane cross-section, including an intermediate sleeve;

FIG. 7b is a partial perspective detail view, showing the embodiment of FIG. 7a, with the rim shown in axial plane cross-section, and with the spoke, intermediate sleeve, and spoke nipple next assembled through a spoke hole of the rim;

FIG. 7c is an axial plane cross-section exploded detail view, taken along 72-72, of the embodiment of FIG. 7a and corresponding to the assembly sequence of FIG. 7a;

FIG. 7d is an axial plane cross-section detail view, taken along 72-72, of the embodiment of FIG. 7a and corresponding to the assembly sequence of FIG. 7b, showing the enlarged portion of the spoke longitudinally overlapping both the spoke hole of the rim and the opening of the intermediate sleeve;

FIG. 8a is a partial perspective exploded detail view of a sixth embodiment of the present invention, with the rim shown in axial plane cross-section, including a stepped sleeve;

FIG. 8b is a partial perspective detail view, showing the embodiment of FIG. 8a, with the rim shown in axial plane cross-section, and with the spoke, stepped sleeve, and spoke nipple next assembled through a spoke hole of the rim;

FIG. 8c is an axial plane cross-section exploded detail view, taken along 73-73, of the embodiment of FIG. 8a and corresponding to the assembly sequence of FIG. 8a;

FIG. 8d is an axial plane cross-section detail view, taken along 73-73, of the embodiment of FIG. 8a and corresponding to the assembly sequence of FIG. 8b, showing the enlarged portion of the spoke longitudinally overlapping both the spoke hole of the rim and the opening of the stepped sleeve, and showing the stepped sleeve longitudinally overlapping the spoke hole.

DETAILED DESCRIPTION OF THE INVENTION

Figure 2A:
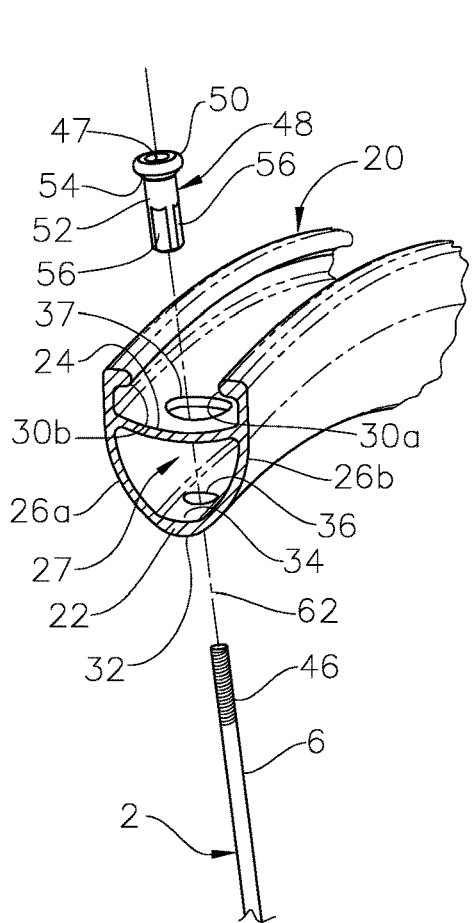
FIG. 2a is a partial perspective exploded view of a wheel of prior art design, including an "external" spoke nipple, with the rim shown in axial plane cross-section.

FIGS. 1a-b describe the basic configuration of an exemplary prior art vehicle wheel, in particular, a bicycle wheel 1, as well as a description of the direction conventions used throughout this disclosure. For clarity, the bicycle frame and the quick release skewer assembly are not shown in this figure. The hub shell 14 is rotatable about the axle 9 and includes at least two axially spaced hub flanges 16*a* and 16*b*, each of which include a means for connecting with a multiplicity of spokes 2 connected thereto. Axle 9 includes end faces 11*a* and 11*b* that define the spacing of its mounting with the frame (not shown). The axial axis 28 is the axial centerline of rotation of the bicycle wheel assembly 1. The hub flanges 16*a* and 16*b* may be contiguous with the hub shell 14 or may be separately formed and assembled to the hub body 12 portion of the hub shell 14. Each spoke 2 is affixed to its respective hub flange 16*a* or 16*b* at its first end 4 and extend to attach the rim 8 at its second ends 6. The tire 10 is fitted to the outer periphery of the rim 8. The wheel of FIG. 1 is generic and may be of tension-spoke or compression-spoke design.

The axial direction 92 is any direction parallel with the axial axis 28. The radial direction 93 is a direction generally perpendicular to the axial direction 92 and extending generally from the axial axis 28 radially outwardly toward the rim 8. The tangential direction 94 is a direction generally tangent to the rim at a given radius. The circumferential direction 95 is a cylindrical vector that wraps around the axial axis 28 at a given radius. A radial plane 96 is a plane perpendicular to the axial axis 28 that extends in a generally radial direction at a given axial intercept. An axial plane 97 is a plane that is generally parallel to the axial axis. An orientation that is radially inboard (or inward) is nearer to the axial axis 28 of rotation and a radially outboard (or outward) is further from the axial axis. An axially inboard (or inward) orientation is an orientation that is axially proximal to the axial midpoint between the two end faces 11*a* and 11*b*. Conversely, an axially outboard (or outward) orientation is an orientation that is axially distal to the axial midpoint between the two end faces 11*a* and 11*b*. A radially inboard orientation is an orientation that is radially proximal to the axial axis 28 and a radially outboard orientation is an orientation that is radially distal to the axial axis 28. An axially inwardly facing surface is a surface that faces toward the axial midpoint between the two end faces 11*a* and 11*b*. Conversely, an axially outwardly facing surface is a surface that faces away from the axial midpoint between the two end faces 11*a* and 11*b*. While it is most common for the hub shell 14 to rotate about a fixed axle 9, there are some cases where it is desirable to permit the axle 9 to be fixed with the wheel 1 such as the case where the wheel 1 is driven by the axle 9.

For the purposes of using conventional terminology, the term "hub flange" is used herein to describe a region of the hub shell 14 to which the spokes 2 are joined. While the surface of the hub flange may be raised and flange-like in comparison to other surfaces of the hub shell 14, this is not a requirement for the present invention and the hub flange 16 may alternatively be flush or recessed relative to other hub shell surfaces.

As is well known in the art, a wheel 1 may be of tension-spoke construction, where the central hub hangs in tension by the spokes from the rim portion directly above, or it may be of compression-spoke construction, where the hub is supported by compressing the spoke directly beneath it. Since the present invention may be directed toward bicycle wheels and since the tension-spoke wheel is generally a more efficient structure than compression-spoke wheel, most of the discussion herein is focused with an eye toward tension-spoke wheel construction. However, it is anticipated that most, if not all, of the embodiments of the present invention may be adapted or otherwise applied to compression-spoke wheel construction as well. For a tension-spoke wheel, it is preferable that the wheel includes at least two hub flanges that are axially spaced on either side of the rim or, more specifically, the spoke attachment points at the rim. Thus the spokes fixed to opposite hub flanges will converge as they extend to the rim. Additionally, a tension-spoke wheel will usually be pre-tensioned during assembly to create a pre-tensioned structure of balanced spoke tension that allows the axle supporting loads to be distributed among several, if not all, of the spokes of the wheel. It is this ability to share the stresses among its spokes that helps to make the tension-spoke wheel the highly efficient structure that it is. For a compression-spoke wheel, it is often preferable to employ at least two axially spaced hub flanges, however, in the case where the spokes have sufficient bending stiffness to support the requisite lateral or side-to-side loads, only a single hub flange may be employed.

The midplane 19 of the wheel 1 is a radial plane axially positioned midway between the flanges 16*a* and 16*b*. The spokes 2 connected to their respective flanges 16*a* and 16*b* commonly converge axially (by bracing angles 18*a* and 18*b*) to their connection point with the rim 8.

The spoke 2 is a generally long slender tensile element with a longitudinal axis 62 along its length and generally parallel to its sidewalls. The spoke 2 also has a tensile axis 61 of applied tensile load 58 that extends along the span portion of the spoke 2 between its anchor points at the rim 8 and hub flange 16. The tensile axis 61 is generally collinear to the longitudinal axis 62, except where the spoke 2 is bent to deviate from the tensile axis 61. For the purposes of definition, as relating to spokes 2 and connections thereto, the term "longitudinal" herein refers to alignment along the longitudinal axis 62. A longitudinally inboard (or inward) orientation refers to an orientation proximal the midpoint of the span portion. Conversely, a longitudinally outboard (or outward) orientation refers to an orientation distal the midpoint of the span portion. The term "lateral" herein refers to an orientation in a direction generally perpendicular to the longitudinal axis 62. A laterally inboard (or inward) orientation refers to an orientation proximal the longitudinal axis. Conversely, a laterally outboard (or outward) orientation refers to an orientation distal the longitudinal axis 62.

FIGS. 2*a-e* describe an exemplary rim 20 of generally conventional geometry. As detailed in FIGS. 2*a* and 2*b*, rim 20 is of a generally hollow construction, commonly termed "double-wall" construction, and includes a radially inboard spoke bed 22 wall of thickness 23 and a radially outboard tire bed 24 wall and generally radially extending sidewalls 26*a* and 26*b* to define a generally hollow circumferential cavity 27. Spoke bed 22 is a wall or web portion of the rim 20 that includes a radially inboard surface 32 and a radially outboard surface 34 and is defined herein as the portion of the rim to which the spoke is structurally connected and/or anchored. Hooked flanges 30*a* and 30*b* are adapted to engage the beads of a conventional tire (not shown).

Figure 2C:
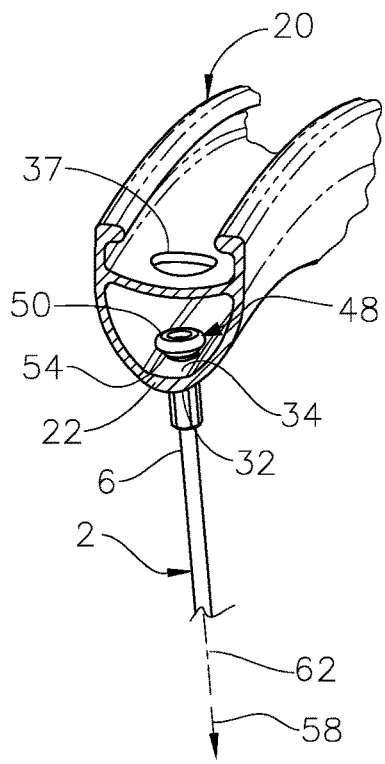
FIG. 2c is a partial perspective view, with the rim in axial plane cross-section, showing the wheel of FIG. 2a with the spoke and nipple assembled to the rim.
Figure 2B:
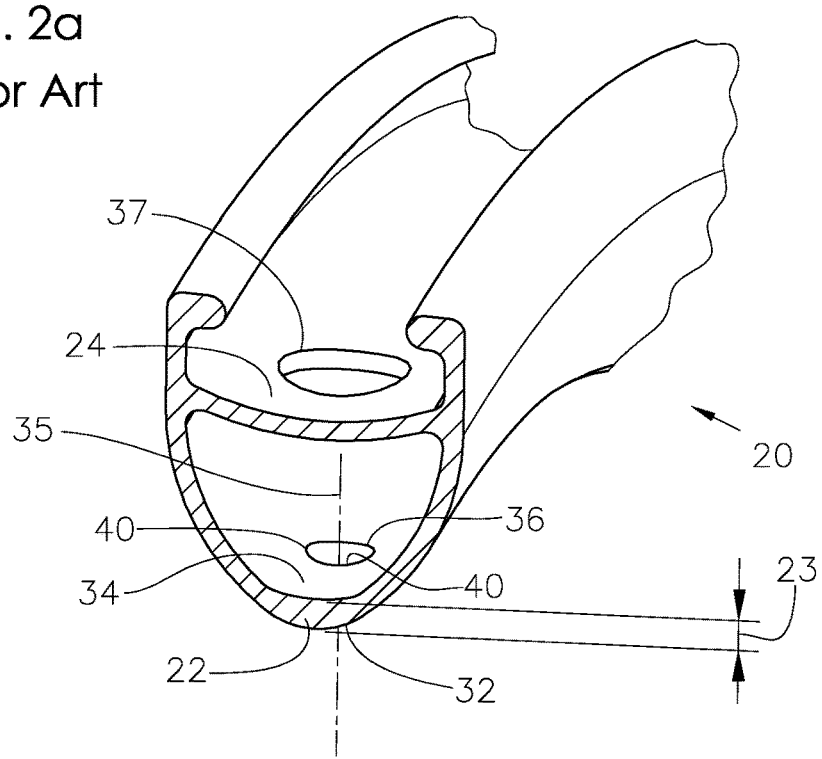
FIG. 2b is an enlarged detail of a portion of the rim of FIG. 2a, with the rim shown in axial plane cross-section.

The spoke bed 22 is pierced with a plurality of spoke holes 36 adapted for connection with their respective spokes 2 via spoke nipples 48. The term "nipple" and "spoke nipple" are used interchangeably herein. It may be seen that the spoke hole 36, which extends along hole axis 35, has a radially inboard entrance 38 at its intersection with the radially inboard surface 32 and a radially outboard entrance 40 at its intersection with the radially outboard surface 34. Spoke hole 36 is most commonly a circular cylindrical hole that is commonly produced by drilling along hole axis 35 or by other fabrication processes. The tire bed 24 wall is pierced by access hole 37 that is preferably aligned with spoke hole 36, to permit the nipple 48 to be assembled as shown in FIGS. 2*a* and 2*c*. Note that access hole 37 is merely one common means to permit the nipple 48 to be assembled to the rim; a wide range of alternative means may be substituted, including means that do not require an access hole.

It is useful to understand that it is common to manufacture the rim 20 by extruding the straight profile shown here and rolling the extrusion into a circumferential hoop with its ends joined by either a welded, sleeved or pinned connection. Spoke holes 36 and access holes 37 are then drilled in their proper locations.

Figure 2E:
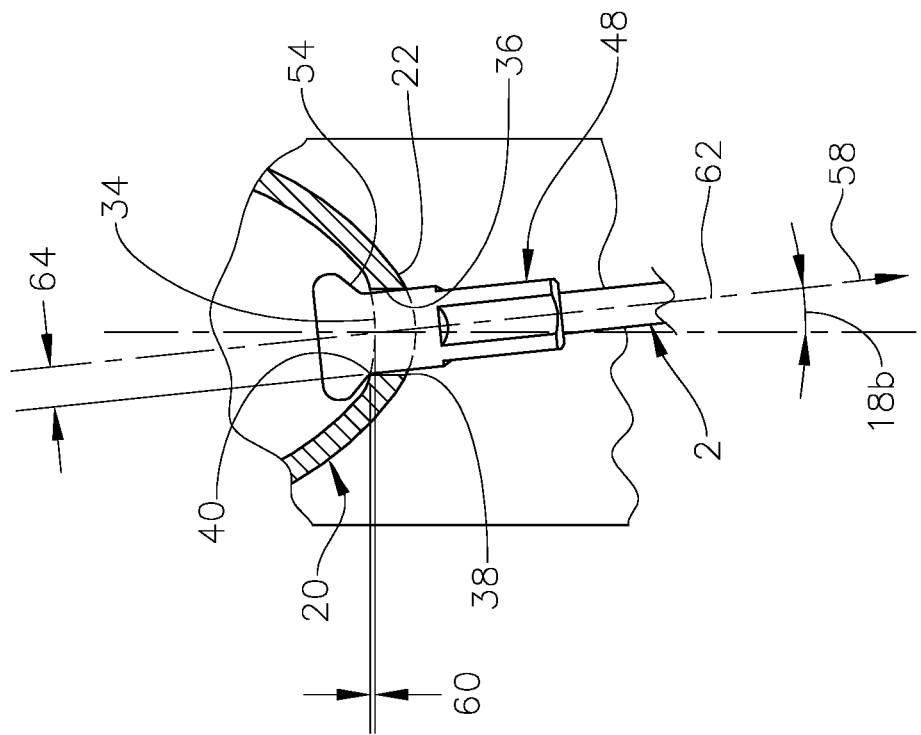
FIG. 2e is an axial plane cross-section detail view corresponding to boundary 57 of FIG. 2d.
Figure 2D:
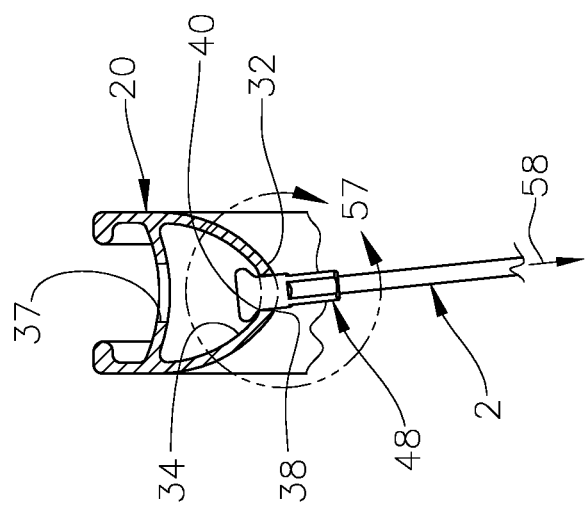
FIG. 2d is an axial plane cross-section detail view of the wheel of FIG. 2a in the configuration shown in FIG. 2c.

FIG. 2*a* shows an exploded view that describes the conventional arrangement by which the second end 6 of the spoke 2 is connected to the rim 20. The second end 6 of spoke 2 includes external threads 46 to mate with internal threads 47 of spoke nipple 48. Spoke nipple 48 includes an enlarged head 50 and a shank 52, with a generally conical tapered transition portion 54 extending radially outwardly between the shank 52 and the underside of the head 50. Spoke nipple 48 also includes flats 56 for engagement with a mating wrench (not shown) for manual manipulation to adjust the spoke pre-tension by adjusting the threaded engagement between external threads 46 and internal threads 47. Nipple 48 is considered an "external" spoke nipple, since it has a shank 52 that extends through the spoke hole 36 so that its flats are exposed and may be manipulated externally to the rim 20. FIGS. 2*c-e* shows the spoke nipple 48 threadably assembled to the spoke 2 such that the transition portion 54 overlies and contacts the outboard entrance 40. The spoke nipple 48 is thereby structurally braced against the spoke bed 22 to resist the spoke tension 58 of the spoke 2.

FIGS. 3*a-g* describe a prior art arrangement that includes an "internal" or "hidden" spoke nipple 122. As particularly shown in FIGS. 3*e-g*, spoke 100 includes a fastener 102 portion having a lateral dimension 114 and having external threads 104 to threadably mate with internal threaded hole 128 of nipple 122. Longitudinally inboard of fastener 102 is enlarged portion 106, having a sidewall surface 121 that is laterally outboard and offset from the corresponding sidewall surface 105 of the external threads 104 and that has lateral dimensions 116*a* and 116*b*. Transition surface 108 extends generally laterally between sidewall surface 105 of fastener 102 and sidewall surface 121 of enlarged portion 106 by dimensions 120*a* and 120*b*. Longitudinally inboard of enlarged portion 106 is stepped portion 110, having a sidewall surface 111 that is laterally outboard and offset from the sidewall surface 121 and that has lateral dimensions 118*a* and 118*b*. Transition surface 112 extends generally laterally between enlarged portion 106 and stepped portion 110. Enlarged portion 106 and stepped portion 110 are shown here to be somewhat elliptical and non-circular in cross section such that dimensions 116*a* and 118*a* are greater than respective dimensions 116*b* and 118*b*.

Figure 3A:
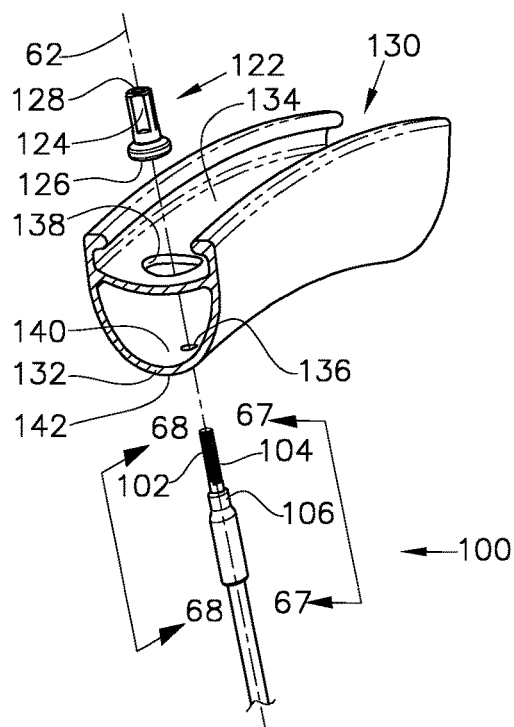
FIG. 3a is a partial perspective exploded detail view of a wheel of prior art design, including an "internal" spoke nipple, with the rim shown in axial plane cross-section.
Figure 3B:
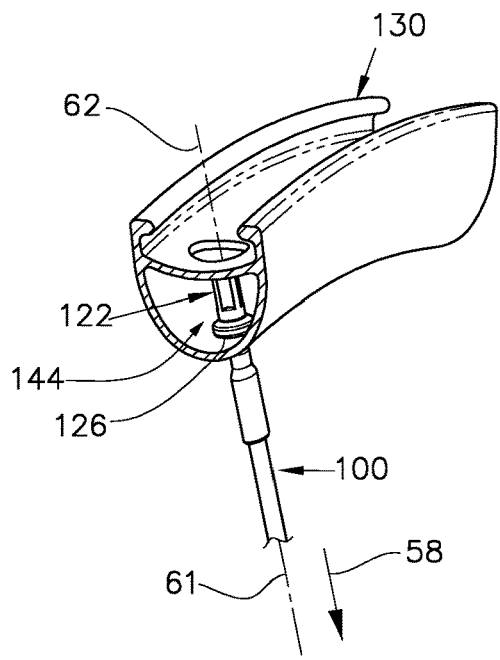
FIG. 3b is a partial perspective detail view, with the rim in axial plane cross-section, showing the wheel of FIG. 3a with the spoke and nipple assembled to the rim.
Figure 3C:
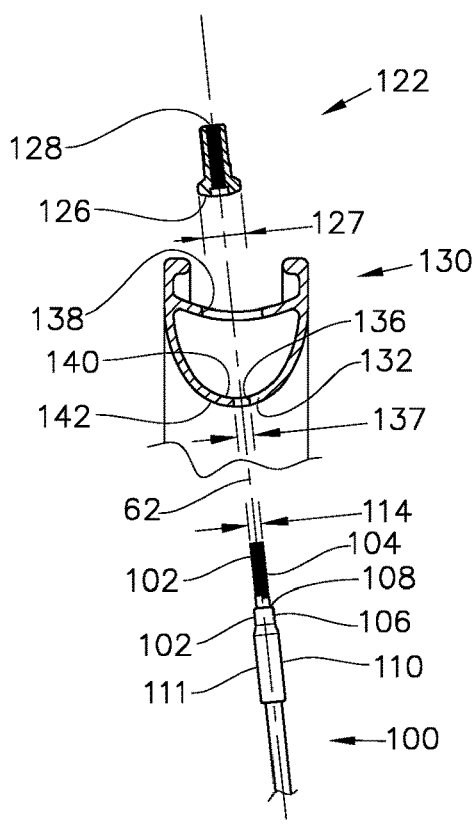
Figure 3D:
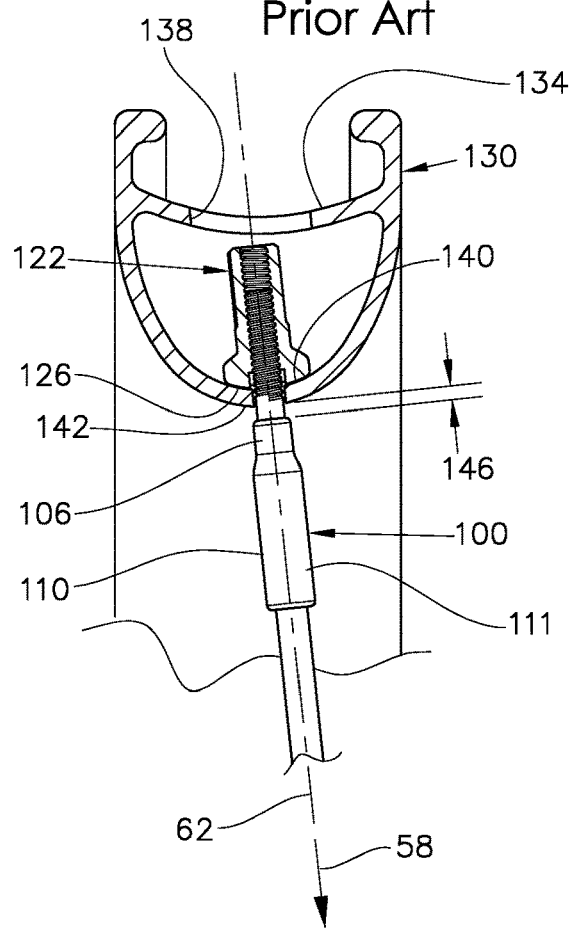
FIG. 3d is an axial plane cross-section detail view of the wheel of FIG. 3a, corresponding to the configuration shown in FIG. 3b.
Figures 3E, 3F, 3G:
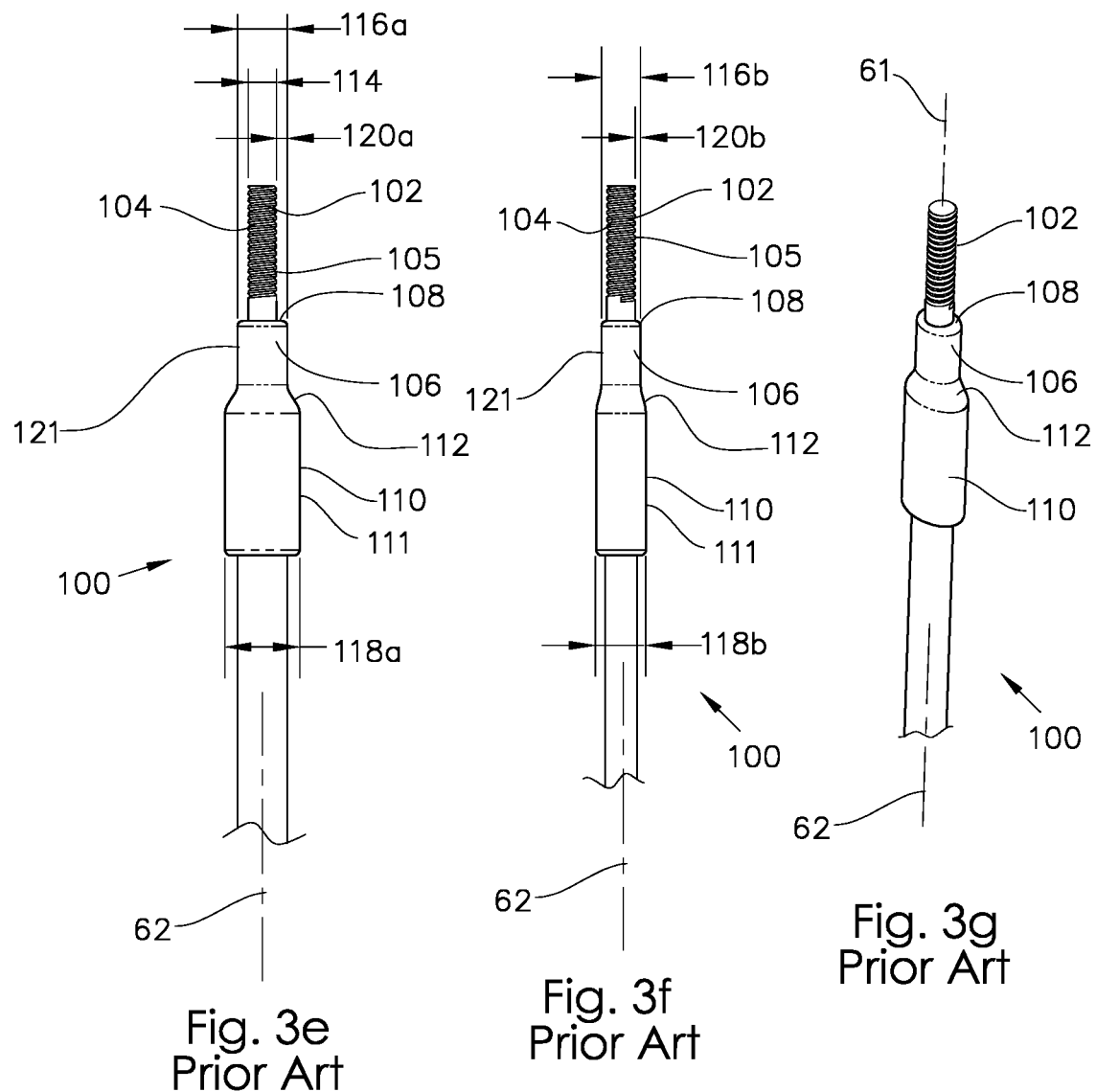

Spoke nipple 122 includes an internally threaded hole 128 for threadable engagement with external threads 104 and a bearing surface 126 to provide an abutting overlie engagement with the outboard surface 140 on assembly as shown in FIGS. 3*b* and 3*d*. Bearing surface 126 has a laterally projecting diameter dimension 127 that is larger than the diameter dimension 137 of spoke hole 136 to provide an overlie engagement therebetween. Nipple 122 also includes flats 124 for manipulation with a mating wrench (not shown).

Rim 130 is of a generally hollow construction, commonly termed "double-wall" construction, and includes a radially inboard spoke bed 132 wall and a radially outboard tire bed 134 wall and generally radially extending sidewalls to define a generally hollow circumferential cavity 144. Spoke bed 132 is defined by a radially inboard surface 142 and a radially outboard surface 140. The spoke bed 132 is pierced with a plurality of spoke holes 136 adapted for connection with their respective spokes 100 via spoke nipples 122. Spoke holes 136 are sized with diameter dimension 137 for clearance with the fastener 102, but are smaller than dimension 116*a* of the enlarged portion 106 such that the enlarged portion 106 will not fit through. The tire bed 134 is pierced by access hole 138 that is preferably aligned with spoke hole 136, to permit the nipple 122 to be assembled as shown in FIGS. 3*b* and 3*d*. Note that access hole 138 is merely one common means to permit the nipple 122 to be assembled to the rim 130; a wide range of alternative means may be substituted, including means that do not require a access hole.

As shown in FIGS. 3*b* and 3*d*, fastener 102 has been assembled through spoke hole 136 and the nipple 122 has been passed through access hole 138 and threadably assembled to fastener 102, with internal threaded hole 128 threadably engaged to external threads 104. Bearing surface 126 is abutting and bearing against outboard surface 140 in an overlie engagement therebetween to support spoke tension 58. This is a conventional arrangement that utilizes an internal or "hidden" spoke nipple, where the nipple 122 is hidden within the cavity 144 of the rim 130 and is not exposed, particularly after a tire is mounted to the rim in a conventional arrangement. There is a longitudinal gap 146 between the transition surface 108 and the inboard surface 142. The transition surface 108 is visually exposed and radially inwardly external to the rim 130. In the case where the spoke 100 includes an enlarged portion 106, the exposed portion of the thin fastener 102 within gap 146 is considered to be aesthetically unappealing and detracts from the overall visual appearance of the wheel assembly 1. The exposed transition surface 108 further detracts from the visual aesthetics and the aerodynamic efficiency of the associated wheel assembly 1.

FIGS. 4*a-d* describe an arrangement that eliminates the gap 146 and conceals the transition surface 108 to create a more visually appealing and aerodynamic wheel assembly 1. Spoke 100 and nipple 122 are identical to that described in FIGS. 3*a-g*. Rim 150 is schematically identical to rim 130 of FIGS. 3*a-d* and includes a radially inboard spoke bed 152 wall and a radially outboard tire bed 154 wall and generally radially extending sidewalls to define a generally hollow circumferential cavity 164. Spoke bed 152 is a wall defined by a radially inboard surface 162 and a radially outboard surface 160, including thickness 166 therebetween. It is noted that outboard surface is a curved convex surface as shown here to provide enhanced alignment with the nipple 122 upon assembly. In this example, the radially inboard periphery 153 of the rim 150 includes the inboard surface 162. The spoke bed 152 is pierced with a plurality of spoke holes 156 adapted for connection with their respective spokes 100 via spoke nipples 122. Spoke holes 156 are sized with dimension 157 that is larger than that of spoke holes 136 of FIGS. 3*a-d* and are sized to receive the enlarged portion 106 (as described in FIGS. 4*b* and 4*d*). Spoke holes 156 have a longitudinally inboard entrance 155 at its intersection with the inboard surface 162 and a longitudinally outboard entrance 159. Spoke holes 156 are shown to be circular cylindrical openings such that they may be easily produced by drilling, as is the common fabrication method. However, the spoke hole may alternatively have a non-circular or other profile as may be preferred for functional or fabrication purposes. Spoke bed thickness 166 roughly corresponds to the longitudinal length of the spoke hole 156. Diameter dimension 127 of bearing face 126 is larger than diameter dimension 157 of spoke hole 156 for an overlie engagement therebetween upon assembly.

Figure 4A:
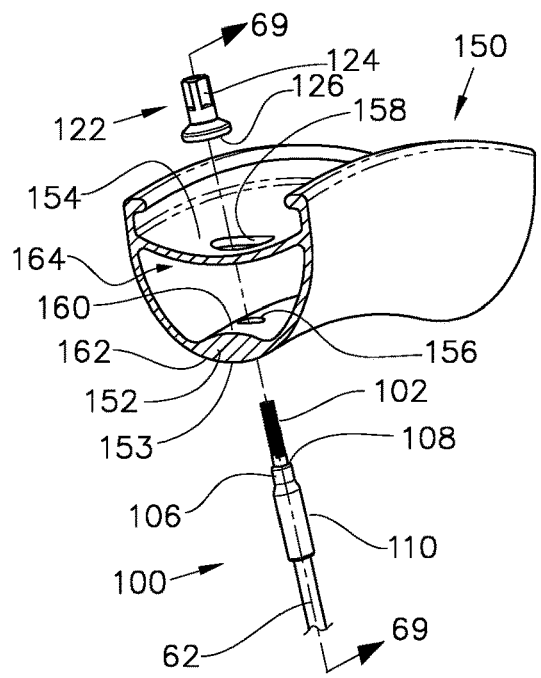
FIG. 4a is a partial perspective exploded detail view of a first embodiment of the present invention, with the rim shown in axial plane cross-section.
Figure 4B:
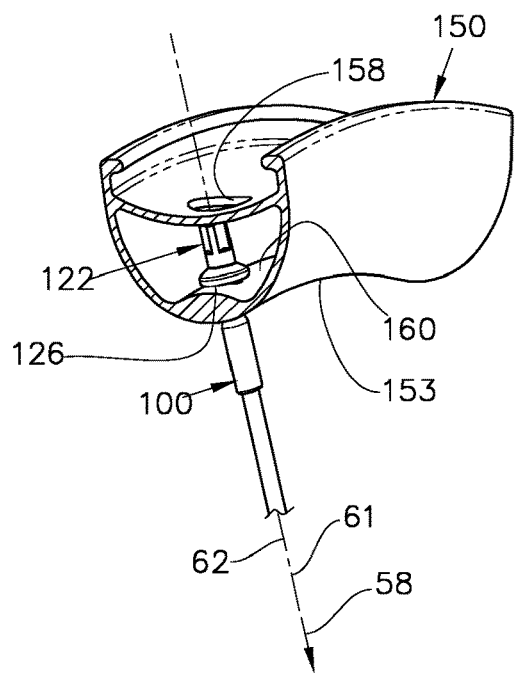
FIG. 4b is a partial perspective detail view, showing the embodiment of FIG. 4a, with the rim shown in axial plane cross-section, and with the spoke and spoke nipple next assembled through a spoke hole of the rim.
Figure 4C:
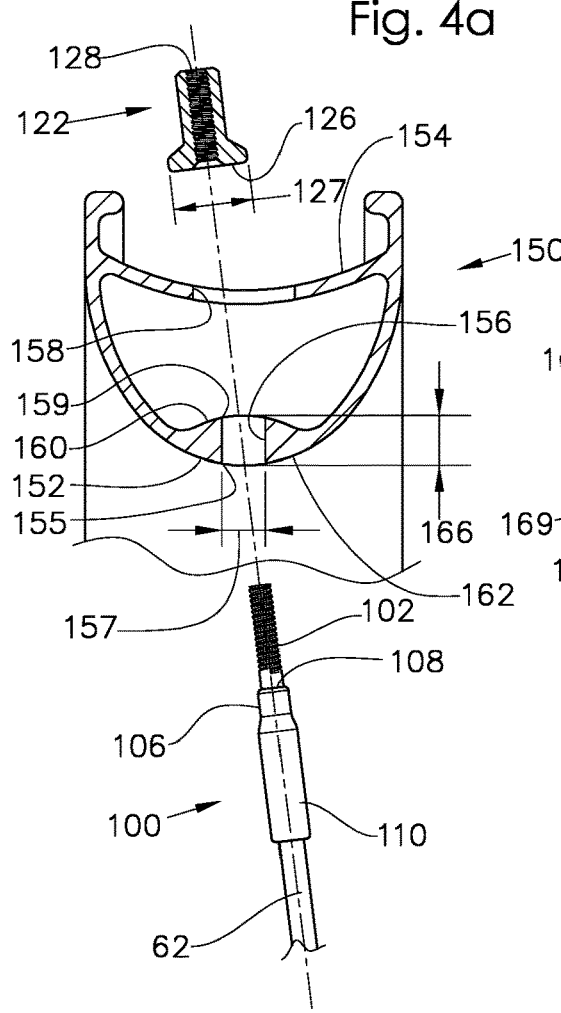
Figure 4D:
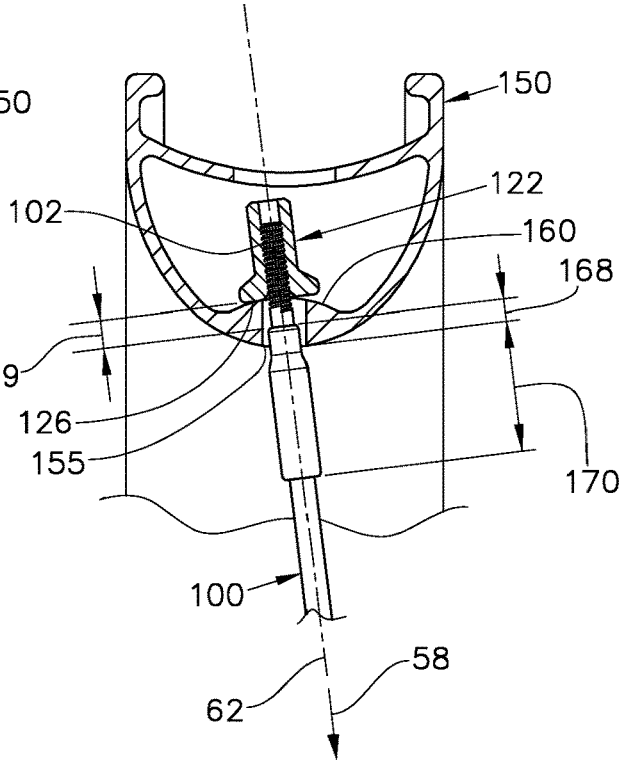
FIG. 4d is an axial plane cross-section detail view, taken along 69-69, of the embodiment of FIG. 4a and corresponding to the assembly sequence of FIG. 4b, showing the enlarged portion of the spoke longitudinally overlapping the spoke hole of the rim.

The spoke 100 includes an optional stepped portion 110 and the spoke hole 156 is shown here to be optionally smaller than dimension 118a of the stepped portion 110 such that the stepped portion 110 will not fit through and to minimize lateral clearance between the enlarged portion 106 and the spoke hole 156. The tire bed 154 is pierced by access hole 158 that is preferably aligned with spoke hole 156, to permit the nipple 122 to be assembled as shown in FIGS. 4b and 4d. Note that access hole 158 is merely one common means to permit the nipple 122 to be assembled to the rim 150.

As shown in FIGS. 4b and 4d, fastener 102 has been assembled through spoke hole 156 while the nipple 122 has been passed through access hole 138 and threadably assembled to fastener 102, with internal threaded hole 128 threadably engaged to external threads 104. Bearing surface 126 is abutting and bearing against outboard surface 160 in a structural overlie engagement therebetween to support spoke tension 58 and to connect the spoke 100 to the rim 150. It is noted that, in comparison to the arrangement of FIGS. 3a-d, FIGS. 4b and 4d show the spoke 100 as advanced longitudinally outwardly such that the transition surface 108 is longitudinally outboard of the entrance 155 by dimension 168 such that both the transition surface 108 and the enlarged portion 106 are also longitudinally overlapping the spoke hole 156.

FIGS. 4b and 4d show the transition surface 108 as positioned to be fully overlapped within the spoke hole 156. However, it is noted that outboard surface 160 and inboard surface 162 may have arcuate contours as shown such that corresponding entrances 159 and 155 are saddle-shaped and radially variable around their perimeter. Further, the spoke 100 is shown to be inclined corresponding to a bracing angle. These geometric arrangements may alternatively permit that, it if the transition surface 108 is close to entrance 155, it is envisioned that only a portion of the transition surface 108 could be longitudinally overlapping the spoke hole 156, with the remainder of the transition surface 108 exposed and longitudinally inboard of the spoke hole 156.

The spoke hole 156 circumscribes the enlarged portion 106 about the longitudinal axis 62 and the transition surface 108 is longitudinally positioned between the inboard entrance 155 and outboard entrance 159. As such, the fastener 102 and a portion of the enlarged portion 106 is shielded and obscured by the rim 150 leaving only the remainder of the spoke 100 exposed. Thus, the exposed length 170 of the enlarged portion 106 and stepped portion 110 is thereby reduced in comparison with the arrangement of FIGS. 3a-d. The result is a more aesthetically and visually appealing connection between the spoke 100 and rim 150 as compared to the arrangement of FIGS. 3a-d. It may be preferred that there remains a longitudinal clearance gap 169 between the transition surface 108 and the bearing face 126 to provide for further threadable adjustment between internally threaded hole 128 and the external threads 104 to adjust spoke tension 58 as needed.

The rim 150 of FIGS. 4a-d is commonly termed as a "double-wall" rim because it has a spoke bed 152 wall separated from the tire bed 154 wall, with a radial gap or cavity 164 between. It is understood that the present invention may be adapted to rims of other configurations, including those commonly termed as "single-wall" rims where the spoke bed wall and the tire bed wall are shared as a common singular wall.

Figure 4E:
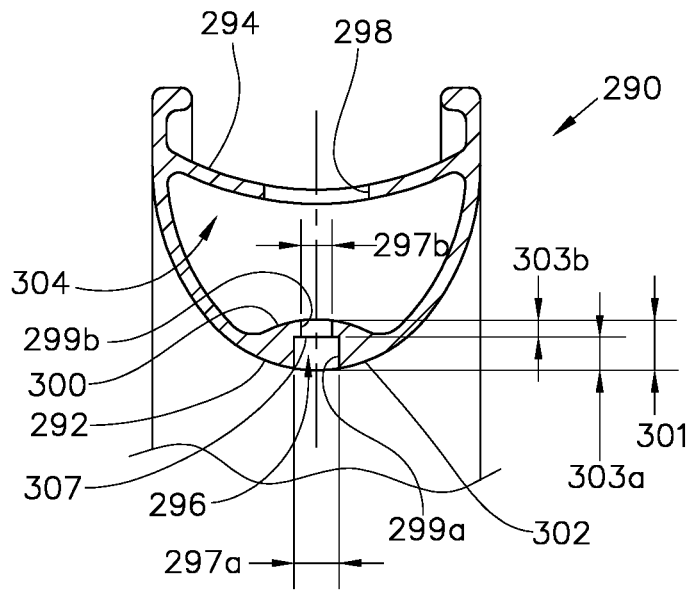
FIG. 4e is an axial plane cross-section detail view, of the rim of a second embodiment of the present invention, including a stepped spoke hole.
Figure 4F:
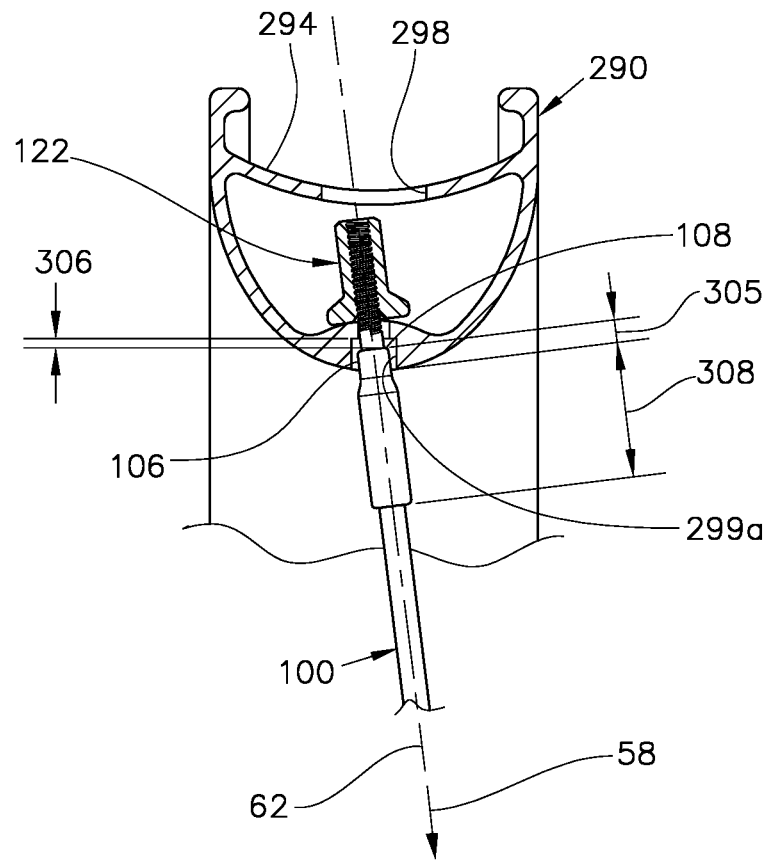
FIG. 4f is an axial plane cross-section detail view of the embodiment of FIG. 4e and corresponding to the assembly sequence of FIG. 4d, showing the enlarged portion of the spoke longitudinally overlapping the stepped spoke hole of the rim.

The embodiment of FIGS. 4e and 4f is identical to the embodiment of FIGS. 4a-d with the exception that spoke hole 296 is stepped to include a laterally enlarged first opening portion 299a and reduced second opening portion 299b, with a laterally projecting transition 307 therebetween. Spoke 100 and nipple 122 are identical to those described in FIGS. 3a-g and 4a-d.

Rim 290 is otherwise schematically identical to rim 150 of FIGS. 4a-d and includes a radially inboard spoke bed 292 wall and a radially outboard tire bed 294 wall and generally radially extending sidewalls to define a generally hollow circumferential cavity 304. Spoke bed 292 is defined by a radially inboard surface 302 and a radially outboard surface 300, including thickness 301 therebetween. It is noted that outboard surface 300 is a curved convex surface as shown here to provide enhanced alignment with the nipple 122 upon assembly. The spoke bed 292 is pierced with a plurality of spoke holes 296 that are stepped to include a longitudinally inboard first opening portion 299a and a longitudinally outboard second opening portion 299b and a laterally extending transition 307 surface therebetween. Second opening portion 299b is sized with diameter dimension 297b to have assembly clearance with the fastener 102. First opening portion 299a is laterally enlarged relative to second opening portion 299b and is sized with diameter dimension 297a for assembly clearance with the enlarged portion 106.

FIG. 4f shows the spoke 100 and nipple 122 assembled to the rim 290 as previously described. Bearing surface 126 is abutting and bearing against outboard surface 300 in an overlie engagement therebetween to support spoke tension 58. Transition surface 108 is longitudinally inboard of the inboard surface 302 such that the enlarged portion 106 is longitudinally overlapping the first opening portion 299a by dimension 305. As such, the fastener 102 and transition surface 108 is obscured by the rim 290 leaving only the remainder of the spoke 100 exposed. Furthermore, the exposed length 308 of the enlarged portion 106 and stepped portion 110 is reduced. The aesthetic and aerodynamic benefit is similar to that described in FIGS. 4a-d. It may be preferred that there remains a longitudinal clearance gap 306 between the transition surface 108 and the transition 307 to provide for further threadable adjustment between internally threaded hole 128 and the external threads 104 to adjust spoke tension 58.

As compared to spoke hole 136 of rim 150, the second opening portion 299b is reduced, which leaves a larger available surface area of outboard surface 300 for bearing interface with the nipple 122. Also, the smaller second opening portion 299b provides for closer lateral alignment of the fastener 102

Figure 5A:
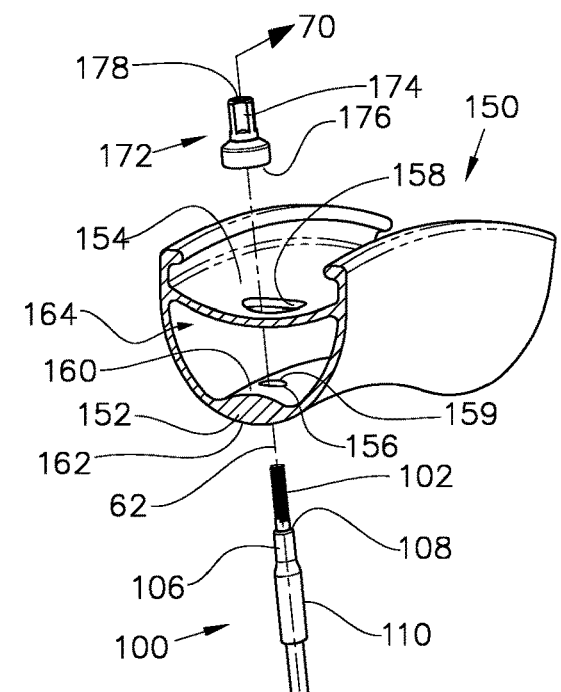
FIG. 5a is a partial perspective exploded detail view of a third embodiment of the present invention, with the rim shown in axial plane cross-section.
Figure 5B:
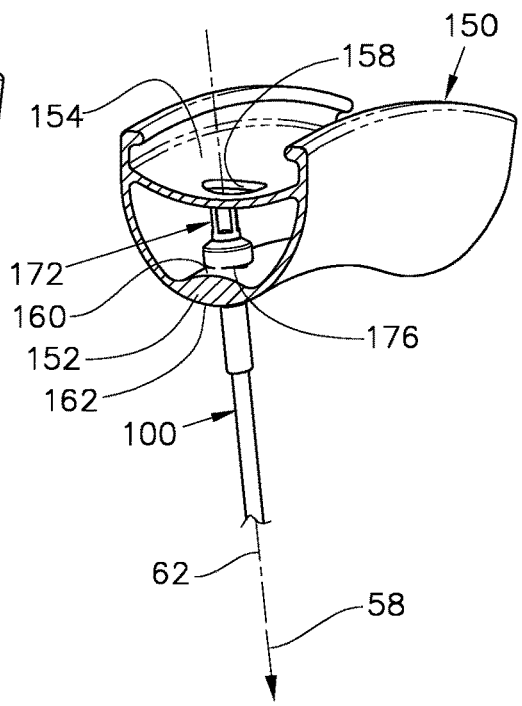
FIG. 5b is a partial perspective detail view, showing the embodiment of FIG. 5a, with the rim shown in axial plane cross-section, and with the spoke and spoke nipple next assembled through a spoke hole of the rim.
Figure 5C:
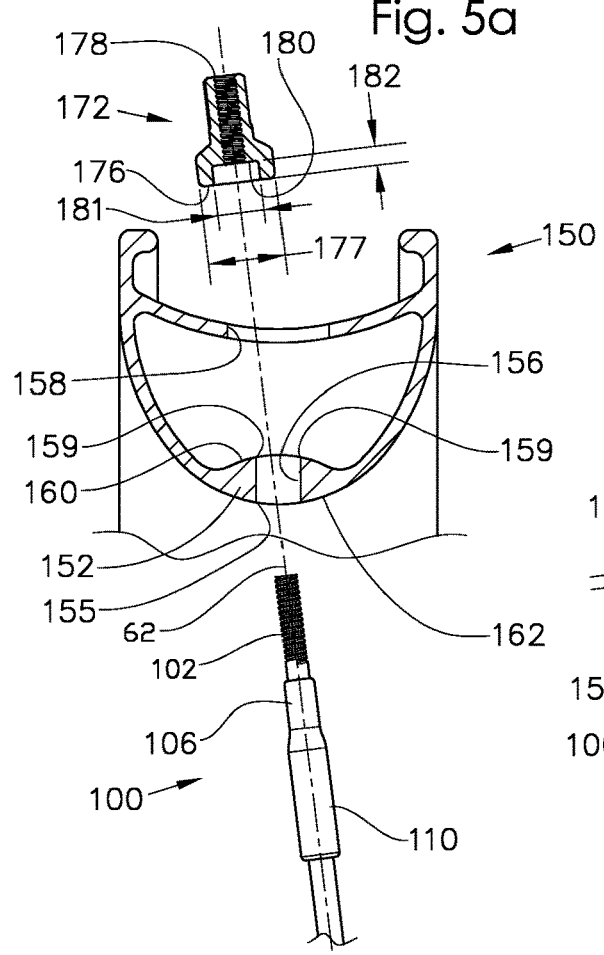
Figure 5D:
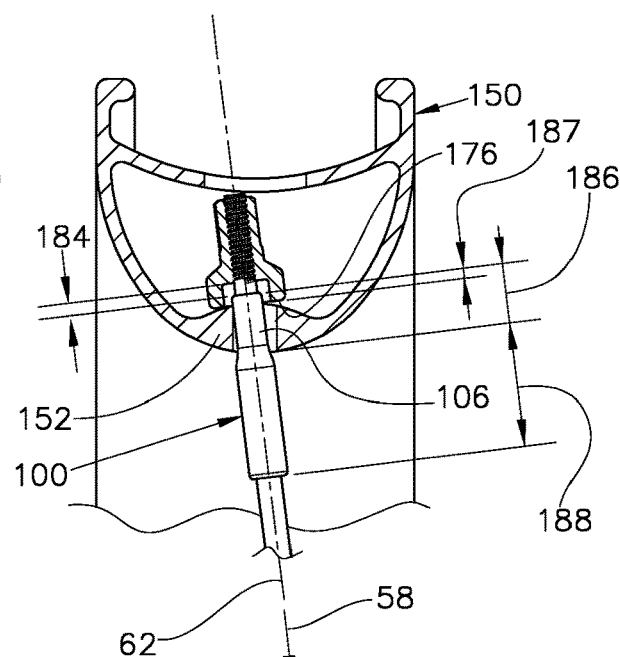
FIG. 5d is an axial plane cross-section detail view, taken along 70-70, of the embodiment of FIG. 5a and corresponding to the assembly sequence of FIG. 5b, showing the enlarged portion of the spoke longitudinally overlapping both the spoke hole of the rim and a recess of the spoke nipple.

FIGS. 5a-d describe another arrangement that eliminates the gap 146 (shown in FIG. 3d) to create a more visually appealing wheel assembly 1. Spoke 100 is generally identical to that described in FIGS. 3a-g and rim 150 is identical to that described in FIGS. 4a-d. Nipple 172 is similar to nipple 122 however, nipple 172 includes recess 180 formed directly therein. Spoke nipple 172 includes an internally threaded hole 178 for threadable engagement with external threads 104 and a bearing surface 176 to provide an abutting overlie engagement with the outboard surface 160 on assembly as shown in FIGS. 5b and 5d. Bearing face 176 has a laterally outboard diameter dimension 177 that is larger than the dimension 157 of spoke hole 156 to provide an overlie engagement with the outboard surface 160 of the spoke bed 152. Nipple 172 includes recess 180 therein of diameter dimension 181 and depth dimension 182. Recess 180 extends longitudinally outwardly of bearing face 176 and diameter 181 is sized to receive the enlarged portion 106. Nipple 172 also includes flats 174 for manipulation with a mating wrench (not shown).

As shown in FIGS. 5b and 5d, fastener 102 of spoke 100 has been assembled longitudinally outwardly through spoke hole 156 while the nipple 172 has been passed longitudinally inwardly through access hole 158 and threadably assembled to fastener 102, with internal threaded hole 178 threadably engaged to external threads 104. Bearing surface 176 is abutting and bearing against outboard surface 160 in a structural overlie engagement therebetween to anchor that spoke 100 and support spoke tension 58. FIGS. 5b and 5d show the spoke 100 as advanced longitudinally outwardly such that the transition surface 108 is passed through the spoke hole 156 to a location longitudinally outboard of the outboard entrance 159 and of the bearing face 126. Transition surface 108 is also longitudinally overlapping the recess 180 by dimension 187 such that the enlarged portion 106 is longitudinally overlapping both the full length of the spoke hole 156 and a portion of the depth dimension 182 of recess 180 for a total longitudinal overlap dimension 186. Transition surface 108 and enlarged portion 106 are longitudinally outboard of outboard surface 160 by dimension 187, which also corresponds to the longitudinal overlap between recess 180 and enlarged portion 106. It may be preferred that there remains a longitudinal clearance gap 184 between the transition surface 108 and the bottom of recess 180 to allow for further threadable adjustment between internally threaded hole 128 and the external threads 104 to adjust spoke tension 58 as needed.

As shown in FIGS. 5b and 5d, the entirety of fastener 102 and a portion of the enlarged portion 106 are shielded and obscured by the rim 150 leaving only the remainder of the spoke 100 exposed. Furthermore, the exposed length 188 of the enlarged portion 106 and stepped portion 110 is reduced. The result is a more aesthetically and visually appealing connection between the spoke 100 and rim 150, also with enhanced aerodynamics, as compared to the arrangement of FIGS. 3a-d.

The embodiments of FIGS. 4a-f and 5a-d show the spoke nipple as directly connected and engaged to the spoke bed of the mating rim. Alternatively, an intermediate element may be employed between the spoke nipple and the rim to facilitate the connection therebetween as described in FIGS. 6a-d, 7a-d, and 8a-d.

FIGS. 6a-d describe yet another arrangement that eliminates the gap 146 (of FIG. 3d) to create a more visually appealing and aerodynamic wheel assembly 1. Spoke 100 is identical to that described in FIGS. 3a-g. Rim 190 is schematically identical to rim 130 of FIGS. 3a-d and includes a radially inboard spoke bed 192 wall and a radially outboard tire bed 194 wall and generally radially extending sidewalls to define a generally hollow circumferential cavity 204. Spoke bed 192 is defined by a radially inboard surface 202 and a radially outboard surface 200, including thickness 206 therebetween. It is noted that outboard surface 200 is a flat surface as shown here to support the washer 210 upon assembly. The spoke bed 192 is pierced with a plurality of spoke holes 196 adapted for connection with their respective spokes 100 via spoke nipples 220. Spoke holes 196 are sized with diameter dimension 197 that is larger than spoke holes 136 (FIGS. 3a-d) and is sized with the requisite lateral clearance to receive the enlarged portion 106. Spoke bed thickness 206 roughly corresponds to the longitudinal length of the spoke hole 196. The tire bed 194 is pierced by access hole 198 that is preferably aligned with spoke hole 196, to permit the nipple 220 and washer 210 to be assembled as shown in FIGS. 6b and 6d.

Nipple 220 and washer 210 are combined to provide a function similar to nipple 172 of FIGS. 5a-d, however nipple 220 and washer 210 provide a self-aligning swivel interface 215 for improved spoke 100 alignment with the outboard surface 200. Nipple 220 is similar to nipple 122 (FIGS. 4a-d) however, nipple 220 includes a bearing surface 226 with spherical convex geometry as shown. Spoke nipple 220 includes an internally threaded hole 226 for threadable engagement with external threads 104 and a bearing surface 226 to provide an abutting overlie engagement with the washer 210 on assembly as shown in FIGS. 6b and 6d.

Washer 210 is a generally annular element that includes a longitudinally outwardly projecting outboard face 213, a longitudinally inwardly projecting bearing face 214 and a hole 212 therethrough of diameter 223. Outboard face 213 is a spherically concave surface having a spherical radius matched to the spherical convex radius of bearing surface 226. Bearing face 214 includes a recess 216 or counterbore therein that surrounds hole 212 and is of diameter dimension 219 and depth dimension 217. Bearing face 214 is of a lateral diameter dimension 218 that is larger than the diameter 197 of spoke hole 196 to provide an overlie engagement with the outboard surface 200 upon assembly. Diameter dimension 219 is sized to be slightly larger than dimension 116a to permit enlarged portion 106 to enter and overlap the recess 216.

As shown in FIGS. 6b and 6d, fastener 102 has been assembled through spoke hole 196 while the washer 210 and nipple 220 have been passed through access hole 198, with internally threaded hole 228 threadably assembled to external threads 104 of fastener 104. Convex bearing face 226 is nested in concave outboard face 213 in a matched spherical swivel interface 215. Swivel interface 215 provides for pivoting self-alignment between nipple 220 and washer 210 such that nipple 220 may be aligned with longitudinal axis 62, while bearing surface 214 may be aligned with the outboard surface 200. Bearing surface 214 is abutting and bearing against outboard surface 200 in an overlie engagement therebetween to support spoke tension 58. Washer 210 may be considered as an intermediate connecting element between the spoke nipple 220 and the rim 190, where nipple 220 is connected to the washer 210 in an overlie engagement between bearing face 226 and outboard face 213 and washer 210 is connected to the rim in an overlie engagement between the bearing face 214 and outboard surface 200.

FIGS. 6b and 6d show the spoke 100 as advanced longitudinally outwardly such that the transition surface 108 is longitudinally outboard of the outboard surface 200 and longitudinally overlapping the recess 216 such that the enlarged portion 106 is longitudinally overlapping both the full length of the spoke hole 196 and a portion of the depth dimension 217 of recess 216 for a total longitudinal overlap dimension 211. It may be preferred that there remains a longitudinal clearance gap 221 between the transition surface 108 and the bottom of recess 216 to provide for further threadable adjustment between internally threaded hole 228 and the external threads 104 to adjust spoke tension 58 in the conventional manner.

As such, the fastener 102 and a portion of the enlarged portion 106 are both obscured by the rim 190 leaving only the remainder of the spoke 100 exposed. Furthermore, the exposed length 222 of the enlarged portion 106 and stepped portion 110 is reduced. The result is a more aesthetically and visually appealing connection between the spoke 100 and rim 190 as compared to the arrangement of FIGS. 3a-d.

FIGS. 7a-d describe another arrangement that eliminates the gap 146 to create a more visually appealing wheel assembly 1. Spoke 100 and nipple 122 are identical to that described in FIGS. 4a-g. Rim 130' is identical that shown in FIGS. 3a-d with the exception that spoke hole 136' has a diameter dimension 137' that is larger than diameter dimension 137 (of rim 130) and is sized to provide lateral clearance with the dimension 116a to permit the enlarged portion 106 to pass within spoke hole 136'. It is noted that the outboard surface 140 is a concave arcuate surface as shown. The access holes 138 permit the nipple 122 and sleeve 230 to be assembled as shown in FIGS. 7b and 7d.

Nipple 122 and sleeve 230 are combined to provide a function similar to nipple 172 of FIGS. 5a-d. Nipple 122 is identical to that described in FIGS. FIGS. 4a-f. Sleeve 230 is a generally annular element that includes a radially outwardly projecting outboard face 233, a radially inwardly projecting bearing face 234 and a hole or opening 232 therethrough. Outboard face 233 is matched to the bearing face 126. Bearing face 234 is a convex arcuate saddle-shaped surface that is shown to be matched to the concave arcuate surface of outboard surface 140 surrounding spoke hole 136'. Bearing face 234 is of a lateral diameter dimension 236 that is larger than the diameter 137' of spoke hole 136' to provide an overlie engagement with the outboard surface 140 upon assembly. Opening dimension 238 is sized to be slightly larger than dimension 116a to permit enlarged portion 106 to enter and overlap the opening 232.

As shown in FIGS. 7b and 7d, fastener 102 of spoke 100 has been assembled through spoke hole 136' while the sleeve 230 and nipple 122 have been passed through access hole 138, with internally threaded hole 128 threadably assembled to external threads 104 of fastener 104. Convex arcuate bearing face 234 is nested in concave arcuate outboard face 140 in a matched arcuate and saddle-shaped interface 246. It is preferred that bearing face 234 may swivel relative to bearing face 140 such that that the nipple 122 may self-align with the longitudinal axis 62 that coincides with bracing angle 248. Further, the nested engagement between bearing face 234 and outboard face 140 also provides an anti-rotation engagement therebetween to restrict the rotation of the sleeve 230 relative to the rim 130' about the longitudinal axis 62. This may serve to maintain alignment of the sleeve 230 as the nipple 122 is rotated and threadably adjusted.

Bearing surface 234 is abutting and bearing against outboard surface 140 in a structural overlie engagement therebetween to support spoke tension 58. Simultaneously, bearing surface 126 is abutting and bearing against outboard face 233 in a structural overlie engagement therebetween to support spoke tension 58. Sleeve 230 may be considered as an intermediate connecting element between the spoke nipple 122 and the rim 130, where nipple 122 is connected to the sleeve 230 in an overlie engagement between bearing face 126 and outboard face 233 and sleeve 230 is connected to the rim 130' in an overlie engagement between the bearing face 234 and outboard surface 140.

FIGS. 7b and 7d show the spoke 100 as advanced longitudinally outwardly such that the transition surface 108 is longitudinally outboard of the outboard surface 140 and longitudinally overlapping the opening 232 such that the enlarged portion 106 is longitudinally overlapping both the full length of the spoke hole 136' and a portion of the opening 232 for a total longitudinal overlap dimension 240. It may be preferred that there remains a longitudinal clearance gap 242 between the transition surface 108 and the bearing surface 126 to allow for further threadable adjustment between internally threaded hole 128 and the external threads 104 to adjust spoke tension 58 in the conventional manner.

As such, the fastener 102 is obscured by the rim 130' leaving only the remainder of the spoke 100 exposed. Furthermore, the exposed length 244 of the enlarged portion 106 and stepped portion 110 is reduced. The result is a more aesthetically and visually appealing connection between the spoke 100 and rim 130' as compared to the arrangement of FIGS. 3a-d.

FIGS. 8a-d describe another arrangement that eliminates the gap 146 (of FIGS. 3a-d) to create a more visually appealing and aerodynamic wheel assembly. Spoke 250 is similar to spoke 100, except that spoke 250 does not include a stepped portion 110. Instead, spoke 250 is geometrically simplified to include: a fastener 252 with external threads 254 and having lateral dimension 258; and an enlarged portion 256 extending longitudinally inwardly therefrom and having lateral dimension 260. Transition surface 262 extends laterally outwardly by dimension 264 between the sidewall of the fastener 252 to the sidewall of the enlarged portion 254.

Nipple 122 is identical to that shown in FIGS. 7a-d. Rim 130" is identical rim 130' shown in FIGS. 7a-d with the exception that spoke hole 136" has a diameter dimension 137" that is larger than diameter dimension 137' and is sized to provide assembly clearance to allow the collar 274 (having external dimension 280) to longitudinally overlap and extend therein. The access holes 138 permit the nipple 122 and sleeve 266 to be assembled as shown in FIGS. 8b and 8d.

Sleeve 266 is similar to sleeve 230 of FIGS. 7a-d and is a generally annular element that includes a longitudinally outwardly projecting outboard face 268, a longitudinally inwardly projecting bearing face 270 and a hole or opening 272 therethrough. Unlike sleeve 230, sleeve 266 includes a cylindrical collar 274 extending longitudinally inwardly from bearing face 270.

Outboard face 268 is matched to the bearing face 126. Bearing face 270 is preferably a convex arcuate surface that is shown to be matched to the concave arcuate surface of outboard surface 140 surrounding spoke hole 136". Bearing face 270 is of a lateral diameter dimension 276 that is larger than the diameter 137" of spoke hole 136" to provide a structural overlie engagement with the outboard surface 140 upon assembly. Opening dimension 278 is sized to be slightly larger than dimension 260 to provide assembly clearance with the enlarged portion 256, allowing the enlarged portion 256 to enter and longitudinally overlap the opening 272. Collar 274 has an external dimension 280 that is sized to be inserted in spoke hole 136" upon assembly.

As shown in FIGS. 8b and 8d, spoke 250 has been inserted longitudinally outwardly through spoke hole 136" while the sleeve 266 and nipple 122 have been passed longitudinally inwardly through access hole 138, with internally threaded hole 128 threadably assembled to external threads 254 of fastener 252. Convex arcuate bearing face 270 is nested in concave arcuate outboard face 140 in a matched interface 215. Bearing surface 270 is abutting and bearing against outboard surface 140 in a structural overlie engagement therebetween to support spoke tension 58. Simultaneously, bearing surface 126 is abutting and bearing against outboard face 268, also in a structural overlie engagement therebetween to support spoke tension 58. Sleeve 266 may be considered as an intermediate connecting element between the nipple 122 and the rim 130", where nipple 122 is connected to the sleeve 266 in an overlie engagement between bearing face 126 and outboard face 268 and the sleeve 266 is connected to the rim 130" in an overlie engagement between the bearing face 270 and outboard surface 140.

In contrast to sleeve 230 of FIGS. 7a-d, the collar 274 of sleeve 266 is shown to be inserted within spoke hole 136" in a longitudinally overlapping arrangement therebetween. Thus, collar 274 may serve as a lateral barrier between the enlarged portion 256 and the sidewall of the spoke hole 136". Such a barrier may serve provide a lubricious interface with the enlarged portion 256 to prevent galling and/or excessive friction between the enlarged portion 256 and spoke hole 136" during threadable adjustment between the nipple 122 and fastener 252 and the corresponding longitudinal displacement of the spoke 250. The collar 274 may also serve to provide a galvanic barrier between enlarged portion 256 and spoke hole 136" to prevent galvanic corrosion therebetween.

FIGS. 8b and 8d show the spoke 250 as next advanced longitudinally outwardly such that the transition surface 262 is longitudinally outboard of the outboard surface 140 and longitudinally overlapping the opening 272 such that the enlarged portion 256 is longitudinally overlapping both the full length of the spoke hole 136" and a portion of the opening 272 for a total longitudinal overlap dimension 284. It may be preferred that there remains a longitudinal clearance gap 286 between the transition surface 262 and the bearing surface 126 to allow for further threadable adjustment between internally threaded hole 128 and the external threads 254 to adjust spoke tension 58 in the conventional manner.

As such, the fastener 252 is obscured by the rim 130" and sleeve 266, leaving only the remainder of the spoke 250 exposed. The result is a more aesthetically and visually appealing connection between the spoke 250 and rim 130" as compared to the arrangement of FIGS. 3a-d.

Figure 9A:
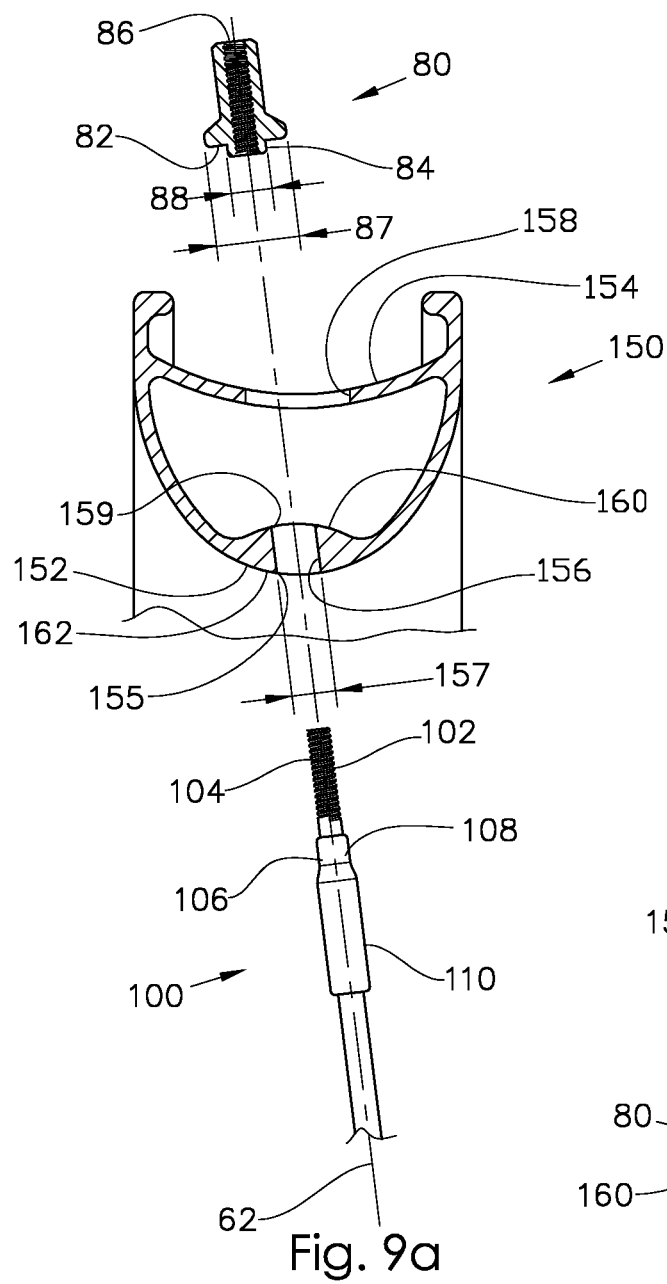
FIG. 9a is an axial plane cross-section exploded view of a seventh embodiment of the present invention, corresponding to the assembly sequence of FIG. 4c, showing a nipple having a pilot collar to maintain laterally piloted alignment between the nipple and the spoke hole of the rim.
Figure 9B:
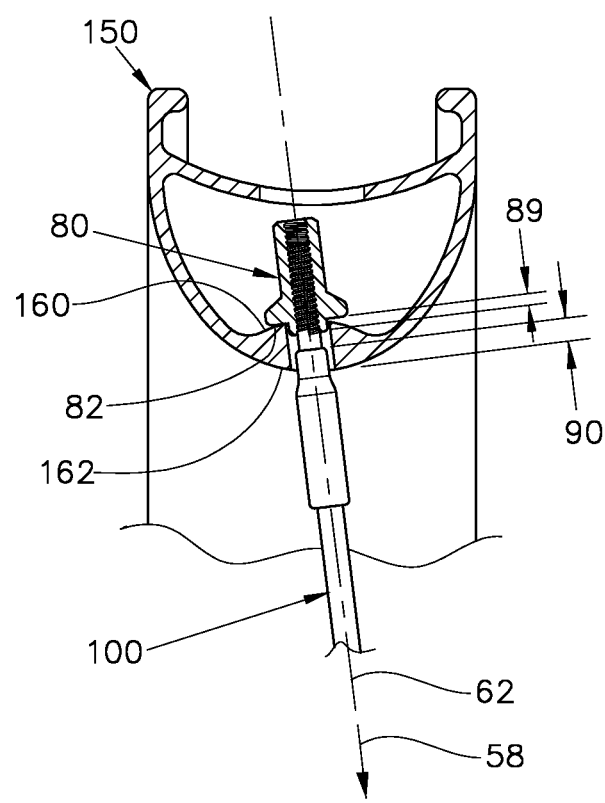
FIG. 9b is an axial plane cross-section detail view of the embodiment of FIG. 9a, corresponding to the assembly sequence of FIG. 4d, showing the pilot collar longitudinally overlapping the spoke hole.

FIGS. 9a-b describes an arrangement similar to FIGS. 4a-d, with the exception that the nipple 80 includes a pilot collar 84 to laterally pilot the nipple 80 relative to the spoke hole 156. Spoke 100 and rim 150 are identical to those shown in FIGS. 4a-d. Nipple 80 includes bearing face 82, internally threaded hole 86, and pilot collar 84. Pilot collar 84 is shown as a circular cylindrical collar of diameter 88 that is sized for insertion assembly within hole 156 as shown in FIG. 9a. Bearing surface 82 serves an identical function as bearing surface 126 (FIGS. 4a-d) and has a diameter 87 that is sized to be larger than diameter 157 of spoke hole 156 such that bearing surface 82 provides a structural overlie engagement with the outboard surface 160 to support spoke tension 58.

Pilot collar 84 is shown in FIG. 9b to longitudinally overlap the spoke hole 156 (by dimension 89) such that it serves to laterally pilot and align the nipple 80 to the spoke hole 156. This ensures that the nipple 80 is advantageously centered with the spoke hole 156 and that the bearing surface 82 does not inadvertently laterally shift relative to the entrance 159, thus maintaining an aligned interface between the bearing face 82 and the outboard surface 160. Enlarged portion 106 is longitudinally overlapping the spoke hole 156 by dimension 90.

While my above description contains many specificities, these should not be construed as limitations on the scope of the invention, but rather as exemplifications of embodiments thereof. For example:

The embodiments herein show the spoke hole of the rim to be a circular spoke hole of circular cylindrical profile. This is particularly advantageous because the spoke hole may be formed in a conventional drilling operation. However, the spoke hole may alternatively be noncircular and of any profile desired. For example, the spoke hole may have a noncircular profile, where the noncircular profile may advantageously be matched to the corresponding cross-section profile of the spoke to minimize clearances therebetween for enhanced aesthetics and aerodynamics. Further, the elongated hole profile may serve to key provide a rotationally keyed engagement to limit relative rotation therebetween about the longitudinal axis.

The embodiments herein show a spoke having an enlarged portion at its second end that is longitudinally overlapping a spoke hole of the rim. It is understood that alternatively or additionally, the hub may include a spoke bed and a spoke hole therethrough. In such case, the spoke may include an enlarged portion at its first end in an arrangement similar to the enlarged portion of the second end shown in FIGS. 3e-g (for example). As such, the enlarged portion may longitudinally overlap the spoke hole of the hub in a transposed arrangement similar to any of the embodiments described herein.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications that are within its spirit and scope as defined by the claims.

What is claimed is:

1. A vehicle wheel, comprising:
a peripheral wheel rim;
a central hub with an outer flange;
a plurality of spokes extending between said rim and said hub, wherein at least one of said spokes has a first end portion thereof connected to said hub and a second end portion thereof opposed to said first portion and connected to said rim, and a longitudinal axis along said spoke, a span portion between said rim and said hub, and a tensile axis of applied tensile load along said span portion;
a bracing element including at least a portion of one of said rim and said hub; wherein said bracing element includes a spoke bed wall having: a longitudinally outboard bed surface; a longitudinally inboard bed surface; and a spoke hole therethrough having a first entrance adjacent said inboard bed surface and a second entrance longitudinally outboard of said first entrance;
wherein said spoke includes: a first spoke portion having a first sidewall surface and a first lateral dimension across said first sidewall surface; a second spoke portion longitudinally inboard of said first spoke portion and having a second sidewall surface and a second lateral dimension across said second sidewall surface;
wherein said second sidewall surface projects laterally outwardly of said first sidewall surface to include a laterally outwardly projecting transition surface therebetween;
wherein said spoke extends through said spoke hole and at least a portion of said transition surface is longitudinally outboard of said first entrance; and
wherein said spoke is connected to said bracing element at said first spoke portion.

2. The vehicle wheel according to claim 1, wherein said second spoke portion longitudinally overlaps said spoke hole.

3. The vehicle wheel according to claim 1, wherein said transition surface is entirely located longitudinally outboard of said second entrance.

4. The vehicle wheel according to claim 1, wherein said spoke hole extends along a hole axis and has a circular cylindrical profile about said hole axis.

5. The vehicle wheel according to claim 1, wherein said spoke bed wall is a singular wall between said inboard bed surface and said outboard bed surface.

6. The vehicle wheel according to claim 1, wherein said spoke hole circumscribes said second spoke portion about said longitudinal axis.

7. The vehicle wheel according to claim 1, wherein said rim includes a radially inboard periphery and wherein said radially inboard periphery of said rim includes said inboard bed surface.

8. The vehicle wheel according to claim 1, wherein said spoke hole is a laterally variable opening, including a enlarged hole portion adjacent said inboard surface that is laterally outward of a reduced hole portion that is longitudinally outward of said enlarged hole portion, wherein said enlarged hole portion is laterally enlarged relative to said reduced hole portion, and wherein said transition surface is longitudinally outboard of said inboard surface and longitudinally overlapping said enlarged hole portion.

9. The vehicle wheel according to claim 1, including a spoke nipple threadably engaged to said first spoke portion, and wherein said spoke nipple includes a bearing surface to provide an overlie engagement with said spoke bed to support said tensile load.

10. The vehicle wheel according to claim 9, wherein said overlie engagement is directly between said bearing surface and said outboard bed surface.

11. The vehicle wheel according to claim 9, wherein said spoke nipple includes a nipple recess that extends longitudinally outboard and laterally inboard of said bearing surface, and wherein said recess is sized to receive at least one of said transition surface and said second spoke portion.

12. The vehicle wheel according to claim 11, wherein at least a portion of said transition surface is longitudinally outboard of said bearing surface and is longitudinally overlapping said spoke nipple within said recess.

13. The vehicle wheel according to claim 9, including an intermediate connecting element, wherein said spoke nipple is engaged to said intermediate connecting element and said intermediate connecting element is engaged to said bracing element to support said tensile load.

14. The vehicle wheel according to claim 13, wherein said intermediate connecting element includes an intermediate bearing surface to provide an overlie engagement with said spoke bed to support said tensile load.

15. The vehicle wheel according to claim 14, wherein said intermediate connecting element includes a connector recess that extends longitudinally outboard and laterally inward of said intermediate bearing surface, and wherein said recess is sized to receive said second spoke portion.

16. The vehicle wheel according to claim 15, wherein at least a portion of said transition surface is longitudinally overlapping said intermediate connecting element within said connector recess.

17. The vehicle wheel according to claim 13, wherein said intermediate connecting element includes a longitudinally extending intermediate opening therethrough, said intermediate opening is sized to receive said second spoke portion.

18. The vehicle wheel according to claim 17, wherein said intermediate connecting element is engaged to said bracing element at a first intermediate bearing interface wherein said intermediate opening is a laterally variable opening, including an enlarged opening portion adjacent said first intermediate bearing interface that is laterally outward of a necked opening portion longitudinally outward of said enlarged opening portion, wherein said transition surface is longitudinally outboard of said intermediate bearing interface and longitudinally overlapping said enlarged opening portion.

19. The vehicle wheel according to claim 13, including a swiveling interface between said nipple and said intermediate connecting element.

20. The vehicle wheel according to claim 13, including a swiveling interface between said intermediate connecting element and said bracing element.

21. The vehicle wheel according to claim 13, wherein said nipple may be rotated independently of said intermediate connecting element about said longitudinal axis.

22. The vehicle wheel according to claim 1, wherein said spoke includes a third spoke portion longitudinally inward of said second spoke portion and having a third sidewall surface and a third lateral dimension across said third sidewall surface, wherein said third sidewall surface is laterally outboard of said second sidewall surface, including a stepped surface therebetween.

23. The vehicle wheel according to claim 13, wherein said intermediate connecting element includes a longitudinally inwardly projecting collar that is laterally inboard of said bearing surface and wherein said collar longitudinally overlaps said spoke hole.

24. The vehicle wheel according to claim 9, wherein said spoke nipple includes a longitudinally inwardly projecting pilot collar projecting longitudinally inwardly from said bearing surface to longitudinally overlap said spoke hole.

25. The vehicle wheel according to claim 13, wherein intermediate connecting element has an anti-rotation engagement with said rim to restrict rotation of said intermediate connecting element relative to said rim about said longitudinal axis.

26. The vehicle wheel according to claim 1, wherein at least a portion of said second spoke portion is obscured by at least one of said rim and a sleeve connected to said rim.

27. The vehicle wheel according to claim 1, including a connecting element connected to said spoke, wherein said first portion is connected to said connecting element at a first connection interface and said connecting element is connected to said spoke bed at a second connection interface to support said tensile load.

* * * * *